(12) United States Patent
Nogami et al.

(10) Patent No.: US 8,300,808 B2
(45) Date of Patent: Oct. 30, 2012

(54) ARITHMETIC OPERATION METHOD AND ARITHMETIC OPERATION DEVICE

(75) Inventors: Yasuyuki Nogami, Okayama (JP);
Hidehiro Kato, Okayama (JP);
Yoshitaka Morikawa, Okayama (JP);
Kenta Nekado, Okayama (JP)

(73) Assignee: National University Corporation Okayama University, Okayama (JP)

( * ) Notice: Subject to any disclaimer, the term of this patent is extended or adjusted under 35 U.S.C. 154(b) by 454 days.

(21) Appl. No.: 12/672,214

(22) PCT Filed: Aug. 9, 2008

(86) PCT No.: PCT/JP2008/064369
§ 371 (c)(1),
(2), (4) Date: Feb. 4, 2010

(87) PCT Pub. No.: WO2009/020216
PCT Pub. Date: Feb. 12, 2009

(65) Prior Publication Data
US 2011/0216899 A1    Sep. 8, 2011

(30) Foreign Application Priority Data

Aug. 9, 2007  (JP) ................. 2007-208678

(51) Int. Cl.
*G06F 21/00* (2006.01)
*H04L 9/00* (2006.01)
(52) U.S. Cl. ............... 380/28; 380/29; 380/30; 726/16; 726/17; 726/18; 726/19

(58) Field of Classification Search ............... 380/28
See application file for complete search history.

(56) References Cited

U.S. PATENT DOCUMENTS 7,486,789 B2 *   2/2009   Futa et al. .................. 380/30

OTHER PUBLICATIONS

Oguro et al., "Daen Kyokusen Ango ni Okeru Window-ho no Kosokuka (Efficient Window Method on Elliptic Curve Cryptosystems)", Symposium on Cryptography and Information Security 2002 Yokoshu, pp. 687-692.

(Continued)

*Primary Examiner* — Longbit Chai
(74) *Attorney, Agent, or Firm* — Jordan and Hamburg LLP

(57) ABSTRACT

In an arithmetic operation method and an arithmetic operation device arithmetic operations such as exponentiation or scalar multiplication can be performed at high speed. In the case where there exists a plurality of different elements Y and each element Y is represented by tuples in which a plurality of different elements X are combined with an operator, an arithmetic operation method for calculating each element Y by using an electronic computer, associates each element Y with the element X by setting each element X, sets temporary data having an index indicating whether or not each element Y has an identical element X for each element X, and represents each element Y by the temporary data combined with the operator. When there is a combination of temporary data which is common in plurality of elements Y in temporary data contained in each element Y, new temporary data is set by combining the common temporary data and each element Y consisting of each tuple is calculated using the new temporary data.

17 Claims, 8 Drawing Sheets

OTHER PUBLICATIONS

Aoki et al., "Junkai Window-ho no Daen Kyokusen Ango eno Tekiyo (Cyclic Window Method Applied to Elliptic Curve Cryptosystems)", IEICE Technical Report, vol. 100, No. 324, Sep. 2001.

J.A. Solinas et al., "An Improved Algorithm for Arithmetic on a Family of Elliptic Curves", Proceedings of CRYPTO '97, Lecture Notes in Computer Science, vol. 1294, Springer-Verlag, 1997, pp. 357-361.

T. Yoshida et al., "A Consideration on Efficient Exponentiation in Extension Field for Pairing-based Cryptography", Tech. Rep. of IEICE, ISEC vol. 108, No. 162, pp. 101-108, 2008.

H. Cohen et al., "Handbook of elliptic and hyperelliptic curve cryptography", published by Chapman & Hall/CRC, 2006, pp. 149-150.

H. Cohen et al., "Handbook of elliptic and hyperelliptic curve cryptography", published by Chapman & Hall/CRC, 2006, pp. 146-147.

* cited by examiner

IMAGE OF CALCULATION OF EXPRESSIONS (20),(21),(22) and (23)

ARITHMETIC OPERATION METHOD AND ARITHMETIC OPERATION DEVICE

BACKGROUND OF THE INVENTION

The present invention relates to an arithmetic operation method and an arithmetic operation device, and more particularly an arithmetic operation method or an arithmetic operation device thereof for exponentiation or scalar multiplication.

Conventionally, in the case of using an encryption method such as a public-key cryptography, encrypted data has been generated by multiplying plain text data to be encrypted and an encryption key. And decryption of encrypted data has been performed by multiplying encrypted data and a decryption key.

In this case, plain text data and an encryption key, and encrypted data and a decryption key are respectively elements of an extension field, and the multiplication is performed over the extension field.

For example, in the Elgamal cryptography, an extension field $F_p{}^m$ of characteristic p and extension degree m is used. Particularly, in order to ensure security of encrypted data against decryption by a third party, the key length is set to be 2000 bits. In this case, it is necessary to perform exponentiation operation such as $A^n$ using 2000 bit positive integer $n < p^m$ with respect to a non zero element A of the extension field.

In addition, generally, in order to construct an extension field $F_p{}^m$, an irreducible polynomial f(x) of degree m over an extension field $F_p$ is prepared and letting the zero thereof be $\omega \in F_p{}^m$, the following basis is prepared.

$$\{1, \omega, \omega^2, \ldots, \omega^{m-1}\}$$

This basis is particularly called polynomial basis and any element $A \in F_p{}^m$ is represented by the following expression.

$$A = a_0 + a_1 \omega + \ldots + a_{m-1} \omega^{m-1}$$

That is, a vector representation of an element A becomes $v_A = (a_0, a_1, \ldots, a_{m-1})$.

Further, when a set of conjugate elements of $\omega$ with respect to Fp shown below forms a basis, the set is called a normal basis.

$$\{\omega, \omega^p, \omega^{p^2}, \ldots, \omega^{p^{m-1}}\} \quad [E16]$$

This normal basis is, as shown below, a basis suitable for the Frobenius map and considering any element A of $F_p{}^m$ as follows, $$A = a_0 \omega + a_1 \omega^p + \ldots + a_{m-1} \omega^{p^{m-1}} = (a_0, a_1, \ldots, a_{m-1}) \quad [E17]$$

The Frobenius map is given as follows.

$$A \to A^p$$

$$A^p = a_0 \omega^p + a_1 \omega^{p^2} + \ldots + a_{m-2} \omega^{p^{m-1}} + a_{m-1} \omega = (a_{m-1}, a_0, \ldots, a_{m-2}) \quad [E18]$$

That is, when using the normal basis, it is found out that the Frobenius map does not require mathematical computation. Hereinafter in the present invention, i-th iterate of the Frobenius map is assumed to be denoted as follows.

$$\phi_i(A) = A^{p^i} \quad [E19]$$

Exponentiation operations significantly affect the time required for arithmetic operations for encryption and decryption, and speeding up exponentiation operations leads to speeding up arithmetic operations for encryption and decryption. And hence there has been proposed various methods to perform exponentiation operations at high speed.

As one of the methods, there has been known a binary method (see non-patent document 1, for example.). For example, in the case of performing an arithmetic operation "55P" (P is a point on an elliptic curve.) of a scalar multiplication in an elliptic curve function, since "55" is equivalent to a binary number "110111", the arithmetic operation is performed by making use of "55P" being represented as, $$(110111)_2 P = 2(2(2^2(2P+P)+P)+P)+P$$

, and hence, the number of operations is reduced thus speeding up the arithmetic operation. Here, "$( )_2$" denotes a binary representation. In this binary method, $Flr(\log_2(n))$ times of doublings and $Flr(\log_2(n))/2$ times of multiplications are necessary in average.

In addition, there has been proposed a method called a window method (see non-patent document 2, for example.). In the window method, in the case of assuming a window size to be 3, for example, respective components of $A^2, A^3, A^4, A^5, A^6, A^7$ are preliminarily prepared with respect to an element A. In the case of performing an arithmetic operation $A^{318}$, by making use of "318" being equivalent to a binary number "100111110", $A^{318}$ is represented as, $$A^{318} = A^{(100111110)_2} = \left\{(A^{(100)_2})^{2^3}(A^{(111)_2})\right\}^{2^3} A^{(110)_2} \quad [E20]$$

And since $(100)_2 = 4, (11)_2 = 7, (110)_2 = 6$, the arithmetic operation is performed using components of $A^4, A^6, A^7$. Here, excluding a computation for preparing each component, in the window method, $Flr(\log_2 n) - w$ times of doublings and $Flr(\log_2 n/w)$ times of multiplications are necessary.

Non-patent document 1: H. Cohen and G. Frey et al, "Handbook of elliptic and hyperelliptic curve cryptography", published by Chapman & Hall/CRC, 2006, p. 146.

Non-patent document 2: H. Cohen and G. Frey et al, "Handbook of elliptic and hyperelliptic curve cryptography", published by Chapman & Hall/CRC, 2006, p. 149.

Non-patent document 3: T. Yoshida, H. Kato, K. Nekado, Y. Nogami and Y. Morikawa, "Consideration on Efficient Exponentiation in Extension Field for Pairing-based Cryptography", Tech. Rep. of IEICE, ISEC vol. 108, no. 162, pp. 101-108, 2008.

SUMMARY OF THE INVENTION

However, in recent years, in order to prevent decryption of encrypted data, a key length of encryption key and decryption key have become further longer. And since it is difficult to further shorten the time required for an exponentiation or a scalar multiplication by means of the binary method or the window method, there has been a problem that the time required for encryption and decryption becomes too long.

The inventors, in view of the present situation, have made a study to shorten the processing time for encryption and decryption by enabling to perform arithmetic operations such as an exponentiation and a scalar multiplication at higher speed, and have made the invention.

According to a first aspect of the present invention, there is provided an arithmetic operation method for exponentiation in which an exponentiation $A^n$ of an element A in an extension field $F_p{}^m$ of characteristic p and extension degree m, using an exponent n in p-adic representation $$n = \sum_{i=0}^{s} n_i p^i, \quad 0 \le n_i \le p, \quad s = \lfloor \log_p n \rfloor \qquad [E21]$$

is represented by the Frobenius map as $$A^n = \prod_{i=0}^{s} \varphi_i(A^{n_i}) \qquad [E22]$$

The arithmetic operation method for exponentiation includes a step of putting together, with respect to the exponent n, a term of p having predetermined degree and a term of p having degree higher than the degree by one degree or a plurality of terms of p having degree higher than the degree by more than one degree into a tuple, dividing the exponent n into a plurality of tuples, specifying coefficient of the minimum degree by factoring out each term in each tuple with minimum degree, and in the case where exponentiation of the element A with an exponent of the coefficient is performed with this coefficient being represented in p-adic representation, setting for each column temporary data having an index which indicates whether a value is present at the same column in each tuple, a step of specifying a value of the temporary data using a multiplier in a column at which a value is present in the temporary data, and a step of setting a result of multiplication between the predetermined temporary data as a result of exponentiation with an exponent of the coefficient in each tuple. Due to this, an arithmetic operation for exponentiation can be performed at high speed.

According to a second aspect of the present invention, there is provided an arithmetic operation method for exponentiation which, in the case where the result of exponentiation with an exponent of the coefficient in each tuple is performed, includes steps of specifying a combination of temporary data to be multiplied in common and a step of performing the result of exponentiation with an exponent of the coefficient in each tuple using the combination of the temporary data. Due to this, the number of arithmetic operations can be reduced thereby enabling to speed up an exponentiation.

According to a third aspect of the present invention, there is provided an arithmetic operation method for scalar multiplication in which, denoting a m-th extension field of a finite field $F_p$ of characteristic p as $F_p{}^m$, the total number of rational points as $\#E(F_p{}^m)$, and point at infinity as O, an elliptic curve over a finite field $F_p$ is represented by the following expression, $$E(x,y) = x^3 + ax + b - y^2 = 0, a, b \in \mathbb{F}_p \qquad [E23]$$

an arbitrary rational point A satisfies the following expression, $$[\#E(\mathbb{F}_p{}^m)]A = \mathcal{O} \qquad [E24]$$

and a scalar part [n] is performed ψ-adic expansion represented as $$[n]A = \sum_{i=0}^{s} \{\psi^i([n_i]A)\} \qquad [E25]$$

The arithmetic operation method for scalar multiplication includes a step of putting together, with respect to i, a term of map ψ with predetermined degree and a term of map ψ having a degree higher than the predetermined degree by one degree or plural terms of map ψ having a degree higher than the predetermined degree by more than one degree into a tuple, dividing map F into a plurality of tuples, and specifying a coefficient of minimum degree by factoring out each term in each tuple a step of setting for each column temporary data having an index which indicates whether or not a value is present at the same column in ψ-adic representation in each tuple, in the case where an addition of the element A is performed, with the coefficient being in ψ-adic representation and a step of specifying each $[n_i]A$ in ψ-adic representation which constitutes said each coefficient by results of additions between the temporary data. Due to this, the number of additions can be reduced thereby enabling to speed up an arithmetic operation for scalar multiplication.

According to a fourth aspect of the present invention, there is provided an arithmetic operation method in which, in the case where there exists a plurality of different elements Y and each of the elements Y is represented by tuples in which a plurality of different elements X are combined with an operator, said each element Y is calculated by an electronic computer. The arithmetic operation method includes a step of associating each element X with said each element Y by setting said each element X, a step of setting temporary data having an index which indicates whether or not said each element Y has an identical element X for each said element X and representing said each element Y by the temporary data combined with the operator; in the case where there is a combination of temporary data which is common in plurality of elements Y in temporary data contained in said each element Y, a step of setting new temporary data by combining the common temporary data and a step of calculating each element Y consisting of said each tuple using the new temporary data. Due to this, an arithmetic operation speed can be increased.

According to a fifth aspect of the present invention, there is provided an arithmetic operation method which, in the step of setting new temporary data by combining the common temporary data, divides the plurality of elements Y into a plurality of groups and sets new temporary by combining temporary data which is common in the divided group.

According to a sixth aspect of the present invention, there is provided an arithmetic operation method in which an exponentiation $A^n$ of an element A in an extension field $F_p{}^m$ of characteristic p and extension degree m, using an exponent n in p-adic representation $$n = \sum_{i=0}^{s} n_i p^i, \quad 0 \le n_i \le p, \quad s = \lfloor \log_p n \rfloor \qquad [E26]$$

is represented by the Frobenius map as $$A^n = \prod_{i=0}^{s} \varphi_i(A^{n_i}) \qquad [E27]$$

The operator is multiplication, the plurality of elements Y are given in the form of exponentiation $A^{n_i}$ (Note: $A^{n_i}$ denotes exponentiation of A with exponent $n_i$) defined by each coefficient $n_i$ in p-adic representation of the element A and the plurality of elements X are selected out of A, $A^2$, ..., $A^{2^u}$ (Note: $A^{2^u}$ denotes exponentiation of A with exponent $2^u$)

which are exponentiation of the element A, $u=\text{Flr}(\log_2(\max (n_i)))$ and the Frobenius map thereof.

According to a seventh aspect of the present invention, there is provided an arithmetic operation method in which, in a scalar multiplication, denoting a m-th extension field of a finite field $F_p$ of characteristic p as $F_p^m$, the total number of rational points as $\#E(F_p^m)$, and point at infinity as O, an elliptic curve over a finite field $F_p$ is represented as the following expression, $$E(x,y)=x^3+ax+b-y^2=0, a,b \in \mathbb{F}_p \quad [\text{E28}]$$

an arbitrary rational point A satisfies the following expression, $$[\#E(\mathbb{F}_{p^m})]A = \mathcal{O} \quad [\text{E29}]$$

and a map $\psi$ consisting of coefficient parts [n]A is performed $\psi$-adic expansion represented as $$[n]A = \sum_{i=0}^{s} \{\psi^i([n_i]A)\} \quad [\text{E30}]$$

The operator is addition, the plurality of elements Y are given in the form of scalar multiplication $[n_i]A$ defined by coefficient $[n_i]$ of the $\psi^i$ term and $\psi$ map thereof and the plurality of elements X are selected out of A, [2]A, ..., $[2^u]A$ which are scalar multiplication of the element A, $u=\text{Flr}(\log_2(\max (n_i)))$ and the $\psi$ map thereof.

According to a eighth aspect of the present invention, there is provided an arithmetic operation device for exponentiation in which an exponentiation $A^n$ of an element A in an extension field $F_p^m$ of characteristic p and extension degree m, using exponent n in p-adic representation $$n = \sum_{i=0}^{s} n_i p^i, \quad 0 \le n_i \le p, \quad s = \lfloor \log_p n \rfloor \quad [\text{E31}]$$

is represented by the Frobenius map as $$A^n = \prod_{i=0}^{s} \varphi_i(A^{n_i}) \quad [\text{E32}]$$

The arithmetic operation device for exponentiation puts together, with respect to the exponent n, a term of p having predetermined degree and a term of p having degree higher than the degree by one degree or a plurality of terms of p having degree higher than the degree by more than one degree into a tuple, divides the exponent n into a plurality of tuples, specifies coefficient of the minimum degree by factoring out each term in each tuple with minimum degree, and includes a memory part which stores a value of temporary data which, in the case where exponentiation of the element A with an exponent of the coefficient is performed, by setting for each column temporary data having an index which indicates whether a value is present at the same column in each tuple, is specified using a multiplier in a column at which a value is present in the temporary data and a memory part which stores a result of multiplication between the said predetermined temporary data as a result of exponentiation with an exponent of the coefficient in each tuple. Due to such a constitution, an exponentiation operation can be performed at high speed.

According to a ninth aspect of the present invention, there is provided an arithmetic operation device for exponentiation which includes a memory part which, in the case where the result of exponentiation with an exponent of the coefficient in each tuple is performed, specifies a combination of temporary data to be multiplied in common, performs and stores the result of exponentiation with an exponent of the coefficient in each tuple using the combination of the temporary data.

According to a tenth aspect of the present invention, there is provided an arithmetic operation device for scalar multiplication in which, denoting a m-th extension field of a finite field $F_p$ of characteristic p as $F_p^m$, the total number of rational points as $\#E(F_p^m)$, and point at infinity as O, an elliptic curve over a finite field $F_p$ is represented as the following expression, $$E(x,y)=x^3+ax+b-y^2=0, a,b \in \mathbb{F}_p \quad [\text{E33}]$$

an arbitrary rational point A satisfies the following expression, $$[\#E(\mathbb{F}_{p^m})]A = \mathcal{O} \quad [\text{E34}]$$

and a scalar part [n] is performed $\psi$-adic expansion represented as $$[n]A = \sum_{i=0}^{s} \{\psi^i([n_i]A)\} \quad [\text{E35}]$$

The arithmetic operation device for scalar multiplication puts together, with respect to i, a term of map $\psi$ with predetermined degree and a term of map $\psi$ having a degree higher than the predetermined degree by one degree or plural terms of map $\psi$ having a degree higher than the predetermined degree by more than one degree into a tuple, divides map F into a plurality of tuples, specifies a coefficient of minimum degree by factoring out each term in each tuple, sets for each column temporary data having an index which indicates whether or not a value is present at the same column in $\psi$-adic representation in each tuple in the case where an addition of the element A is performed with the coefficient being in $\psi$-adic representation, and specifies each $[n_i]A$ in $\psi$-adic representation which constitutes said each coefficient by results of additions between the temporary data. Due to such a constitution, a scalar multiplication operation can be performed at high speed.

According to the present invention, an arithmetic operation can be performed at high speed by means of putting together a term having predetermined degree and a term having a degree higher than the predetermined degree by one degree or plural terms having a degree higher than the predetermined degree by more than one degree into a tuple, dividing the tuple into a plurality of tuples, specifying a coefficient of minimum degree by factoring out each term in each tuple, and setting for each column temporary data having an index which indicates whether or not a value is present at the same column in p-adic representation in each tuple.

DETAILED DESCRIPTION OF THE INVENTION

Figure 1:
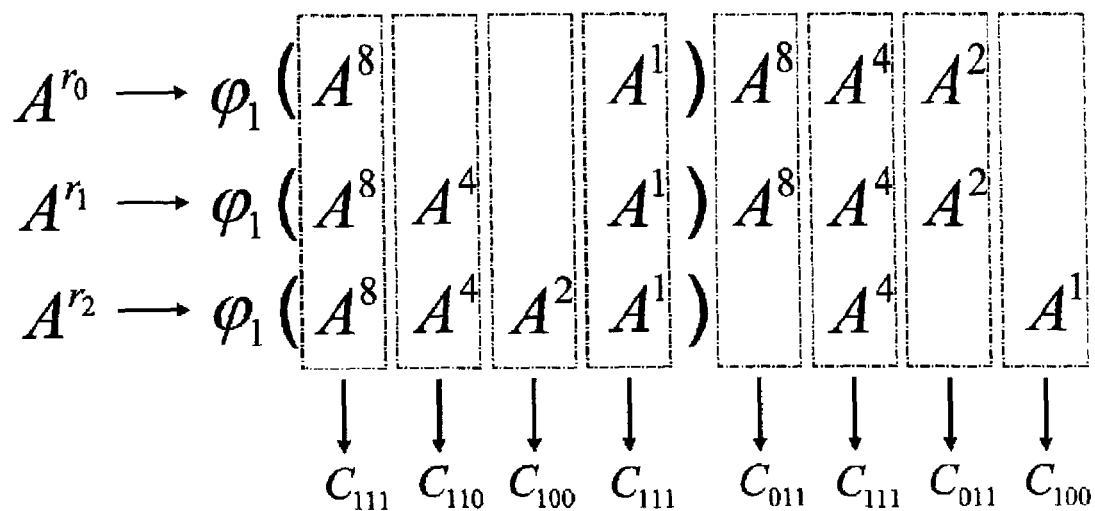
FIG. 1 is an explanatory view of temporary data.

In the following explanation, Floor symbol $$\lfloor \ \rfloor \quad [E36]$$

and Ceiling symbol $$\lceil \ \rceil \quad [E37]$$

are denoted as $$\lfloor \cdot \rfloor = \mathrm{Flr}(\cdot)$$

$$\lceil \cdot \rceil = \mathrm{Ceil}(\cdot) \quad [E38]$$

for convenience of explanation.

Embodiment 1 of Exponentiation

An arithmetic operation method for exponentiation and an arithmetic operation device for exponentiation according to the present invention efficiently extract portions which require the same multiplication and set temporary data therefrom and significantly reduce the number of required multiplications by obtaining values of the temporary data through separate multiplications.

In particular, an exponentiation $A^n$ of an element A in an extension field $F_p^m$ of characteristic p and extension degree m is performed, using p-adic representation of an exponent n $$n = \sum_{i=0}^{s} n_i p^i, \ 0 \leq n_i \leq p-1, \ s = \lfloor \log_p(n) \rfloor \quad [E39]$$

in such a way represented the Frobenius map as, $$A^n = \prod_{i=0}^{s} \varphi_i(A^{n_i}) \quad [E40]$$

For convenience of explanation, $s=\mathrm{Flr}(\log_p n)=5$, $\mathrm{Flr}(\log_2(p-1))=4$ are assumed.

And A raised to the power $n_i$ is denoted as $A[i]$.

In this case, the exponent n is expanded as represented as follows.

$$n = n_5 p^5 + n_4 p^4 + n_3 p^3 + n_2 p^2 + n_1 p + n_0$$

By factoring out each p of even degrees with respect to the exponent n, the exponent n can be represented as follows, $$n = (n_5 p + n_4)p^4 + (n_3 p + n_2)p^2 + (n_1 p + n_0).$$

That is, here, the exponent n is divided into 3 tuples consisting of a tuple of p having degree 4 and p having degree 5 one degree higher than 4, a tuple of p having degree 2 and p having degree 3 one degree higher than 2, and a tuple of the rest p having degree 0 and p having degree 1 one degree higher than 0. For convenience of explanation, let the tuple of p having degrees 0 and 1 be called the 0-th tuple, the tuple of p having degrees 2 and 3 be called the first tuple, and the tuple of p having degrees of 4 and 5 be called the second tuple.

Here, letting, $$r_0 = n_1 p + n_0$$

$$r_1 = n_3 p + n_2$$

$$r_2 = n_5 p + n_4$$

the exponent n can be represented as follows.

$$n = r_2 p^4 + r_1 p^2 + r_0.$$

For convenience of explanation, let $r_0$ be called the 0-th coefficient, $r_1$ be called the first coefficient, and $r_2$ be called the second coefficient.

Accordingly, the exponentiation $A^n$ of an element A is represented as follows using the 0-th coefficient $r_0$, the first coefficient $r_1$, and the second coefficient $r_2$.

$$A^n = \prod_{i=0}^{s} \varphi_i(A^{n_i}) = \varphi_4(A^{r_2})\varphi_2(A^{r_1})A^{r_0} \quad [E41]$$

On the other hand, for convenience of explanation, let coefficients $n_0, n_1, n_2, n_3, n_4, n_5$ of respective degrees of p be as follows in binary representation.

$$n_0 = (1110)_2$$

$$n_1 = (1001)_2$$

$$n_2 = (1110)_2$$

$$n_3 = (1101)_2$$

$$n_4 = (0101)_2$$

$$n_5 = (1111)_2$$

In this case, each $A[i]$ is represented as follows.

$$A[0] = A^8 A^4 A^2$$

$$A[1] = A^8 A^1$$

$$A[2] = A^8 A^4 A^2$$

$$A[3] = A^8 A^4 A^1$$

$$A[4] = A^4 A^1$$

$$A[5] = A^8 A^4 A^2 A^1$$

That is, each $A^{r_i}$ can be represented as follows.

$$A^{r_0} = \phi_1(A[1])A[0] = \phi_1(A^8 A^1)A^8 A^4 A^2$$

$$A^{r_1} = \phi_1(A[3])A[2] = \phi_1(A^8 A^4 A^1)A^8 A^4 A^2$$

$$A^{r_2} = \phi_1(A[5])A[6] = \phi_1(A^8 A^4 A^2 A^1)A^4 A^1 \quad [E42]$$

The present invention, instead of performing these arithmetic operations, introduces new temporary data as shown in FIG. 1. That is, when exponentiation of element A is performed with the 0-th coefficient $r_0$, the first coefficient $r_1$, and the second coefficient $r_2$ in binary representation respectively, temporary data $C_{efg}$ having an index indicating whether or not a value is present at the same column in each tuple is set for each column.

Among subscripts e, f, g in $C_{efg}$ indicative of temporary data, e is an index of the second tuple, f is an index of the first tuple, and g is an index of the 0-th tuple.

And, in the case of FIG. 1, at columns of $\Psi_1(A^8)$, $\Psi_1(A^1)$ and $A^4$, since values are present in the 0-th, first, and second tuples respectively, temporary data is set to be $C_{111}$, at a column of $\Psi_1(A^4)$, since no value is present in 0-th tuple and values are present in the first and second tuples respectively, temporary data is set to be $C_{110}$, and at columns of $\Psi_1(A^2)$ and $A^1$, since no value is present in 0-th and first tuples and a value is present in the second tuple, temporary data is set to be $C_{100}$, and at columns of $A^8$ and $A^2$, since values are present in 0-th and first tuples respectively and no value is present in the second tuple, temporary data is set to be $C_{011}$.

What is mentioned above is summarized as follows for easier understanding.

$C_{111} \leftarrow$ at columns of $\Psi_1(A^8), \Psi_1(A^1), A^4$ $C_{110} \leftarrow$ at column of $\Psi_1(A^4)$ $C_{100} \leftarrow$ at columns of $\Psi_1(A^2), A^1$ $C_{011} \leftarrow$ at columns of $A^8, A^2$ And values of respective temporary data are set as follows.

$C_{111} = \Psi_1(A^8 A^1) A^4$ $C_{110} = \Psi_1(A^4)$ $C_{100} = \Psi_1(A^2) A^1$ $C_{011} = A^8 A^2$

With the use of $n_0, n_1, n_2, n_3, n_4, n_5$ in the explanation which are respective degrees of p, the other temporary data which happen to have no value are all set to be "1". That is as follows.

$C_{101} = C_{010} = C_{001} = 1$

With the use of these temporary data, exponentiation of the element A with the 0-th coefficient $r_0$, exponentiation of the element A with the first coefficient $r_1$, and exponentiation of the element A with the second coefficient $r_2$ can be performed using these temporary data.

That is, exponentiation of the element A with the 0-th coefficient $r_0$ is a product of temporary data whose 0-th index g in temporary data $C_{efg}$ is not "0", as follows.

$R_0 = A^{r_0} = C_{001} C_{101} C_{011} C_{111} = 1 \cdot 1 \cdot A^8 A^2 \cdot \phi_1(A^8 A^1) A^4 = \phi_1(A^8 A^1) A^8 A^4 A^2$ [E43]

Further, exponentiation of the element A with the first coefficient $r_1$ is a product of temporary data whose first index f in temporary data $C_{efg}$ is not "0", as follows.

$R_1 = A^{r_1} = C_{010} C_{110} C_{011} C_{111} = 1 \cdot \phi_1(A^4) \cdot A^8 A^2 \phi_1(A^8 A^1) A^4 = \phi_1(A^8 A^4 A^1) A^8 A^4 A^2$ [E44]

Still further, exponentiation of the element A with the second coefficient $r_2$ is a product of temporary data whose second index e in temporary data $C_{efg}$ is not "0", as follows.

$R_2 = A^{r_2} = C_{100} C_{101} C_{110} C_{111} = \phi_1(A^2) A^1 \cdot 1 \cdot \phi_1(A^4) \cdot \phi_1(A^8 A^1) A^4 = \phi_1(A^8 A^4 A^2 A^1) A^4 A^1$ [E45]

Effect of reduction in the number of multiplications in the case of key length becoming large can be increased compared with the window method or the like, by means that, in this way, coefficients of the exponent are made into components as temporary data for columns including columns of other degrees which are different in the number of operations in the Frobenius map and also, the exponentiation can be performed by [E41] using a result of multiplication of temporary data as exponentiation of coefficient for each tuple. Furthermore, the number of multiplications can be reduced by the number of operations of the Frobenius map.

Here, as shown in FIG. 1, a setting of temporary data is done by regarding the exponentiation as a matrix of 3 rows and 8 columns. However, the setting is not limited to 3 rows and 8 columns, but temporary data may be set as a matrix of appropriate number of rows and appropriate number of columns.

That is, considering number of rows r and number of columns c, an exponent n may be considered as follows.

$$n = \sum_{i=0}^{r-1} \sum_{j=0}^{c-1} n_{ij} p^{ci+j}$$ [E46]

In this case, an exponentiation $A^n$ of an element A can be obtained by the following calculation.

$$S_{jl} = \left\{ x \;\middle|\; \sum_{i=0}^{r-1} 2^i \{(n_{ij} \; \& \; 2^x)/2^x\} = l, \, 0 \le x < t \right\},$$ [E47]

$$0 \le j < c, \, 1 \le l < 2^r$$

$$T_i = \{y \mid (2^i \; \& \; y) = 2^i, \, 1 \le y < 2^r - 1\}, \, 0 \le i < r$$ [E48]

$$C_t = \prod_{j=0}^{c-1} \varphi_j \left( \prod_{k \in S_{jl}} A^{2^k} \right)$$ [E49]

$$R_i = \prod_{j=0}^{c-1} \varphi_j(A^{n_{ij}}) = \prod_{k \in T_i} C_k, \, 0 \le i < r$$ [E50]

$$A^n = \prod_{i=0}^{r-1} \varphi_{ci}(R_i)$$ [E51]

Embodiment 2 of the Exponentiation

Figure 2:
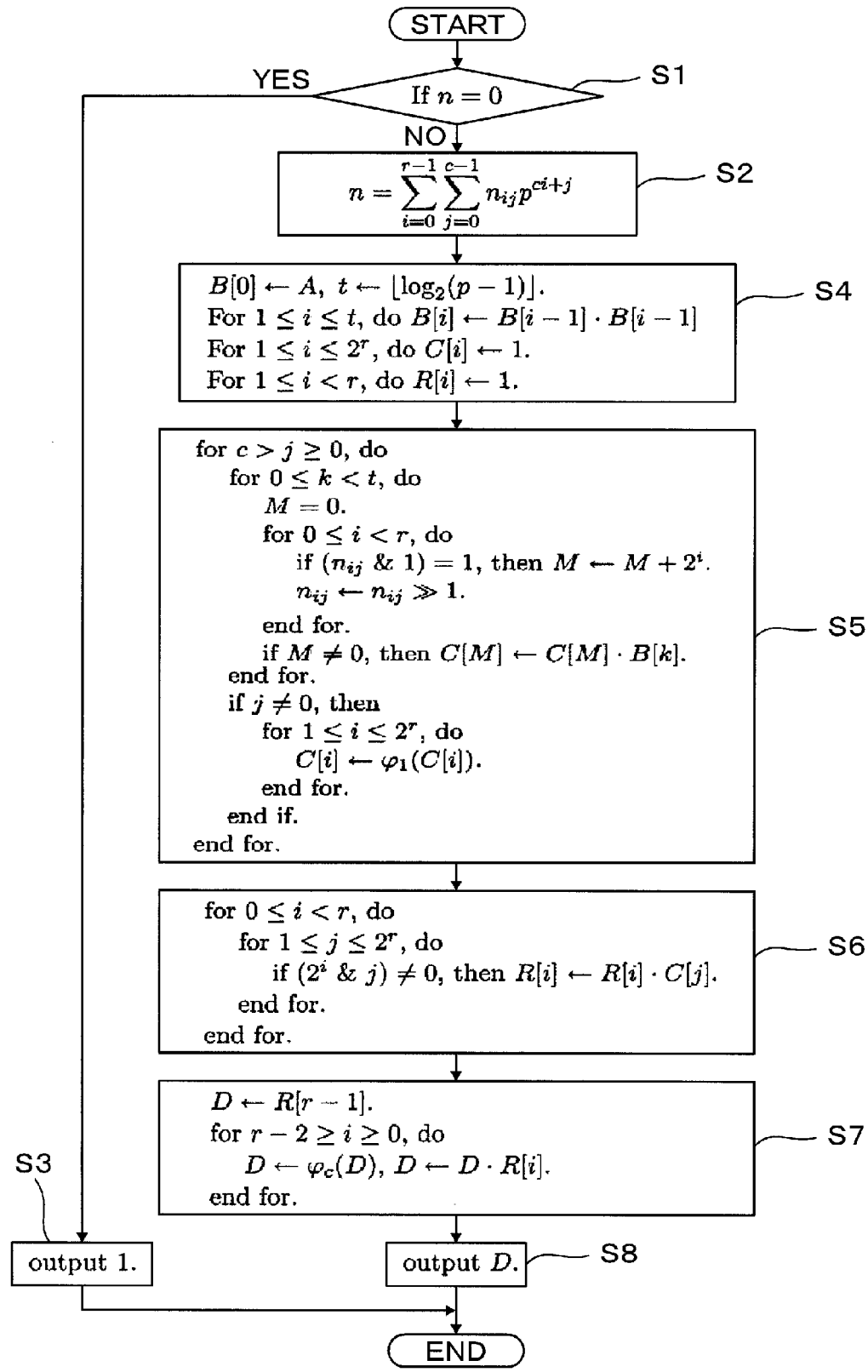
FIG. 2 is a flowchart of an arithmetic operation program for exponentiation.

Accordingly, the exponentiation $A^n$ of the element A can be performed by an electronic computer such as a personal computer using a program based on a flowchart shown in FIG. 2. In addition, this program is generally used as a subroutine program of exponentiation in the multiplication programs of an extension field which are used in encryption and decryption.

First, the electronic computer, when an exponent n is zero (step S1: YES), outputs "1" and finishes (Step S2), and when the exponent n is not zero (step S1: NO), sets an p-adic representation of the exponent n (step S3). In addition, required numerical values for setting of p-adic representation are set by default, and are made changeable as needed.

Moreover, the electronic computer sets initial conditions in the exponentiation (step S4). That is, the element is set by letting B[0]=A, and number of columns, in the case where each coefficients of powers of p in p-adic representation is represented in binary representation, is set by letting Flr($\log_2$(p−1))=t.

Next, the electronic computer, by letting B[i−1]·B[i−1]=B[i] for $1 \le i \le t$, performs a doubling operation and lets C[i]=1 for $0 \le i \le 2^r$ and R[i]=1 for $0 < \le r$.

Next, the electronic computer, supposing the exponentiation divided into a plurality of tuples as shown in FIG. 1, sets temporary data C at the predetermined column (step S5). That is, after letting M=0, the electronic computer determines whether the first column of $n_{ij}$ is "1" for $0 \le i < r$ and when the first column is "1", substitutes $M+2^i$ for M. Next, the electronic computer performs bit shift of $n_{ij}$. Here, "&" in "$n_{ij}$&1" denotes a logical product of $n_{ij}$ and "1", and "$n_{ij}$>>1" denotes a bit shift to the right by 1 bit. Therefore, for example, $(1011)_2$>>1 is $(101)_2$.

Next, the electronic computer calculates a value of set temporary data C by letting "C[M]←C[M]·B[k]" and "C[i]←Ψ$_1$(C[i])".

Next, the electronic computer performs multiplication in each tuple of the exponentiation divided into tuples by letting "R[i]←R[i]·C[i]" using a value of temporary data C (step S6).

Next, the electronic computer obtains D as a value of the exponentiation $A^n$ by letting R[r−1]=D and by calculating "D←Ψ$_c$(D), D←D·R[i]" for r−2≧i≧0 (step S7), outputs this D (step S8).

By means of performing the exponentiation $A^n$ in this way, the number of multiplications can be reduced, thereby enabling to increase the arithmetic operation speed.

Moreover, the exponentiation operation may be implemented by a semiconductor device for multiplication processing formed on a semiconductor substrate as an arithmetic operation circuit.

Figure 3:
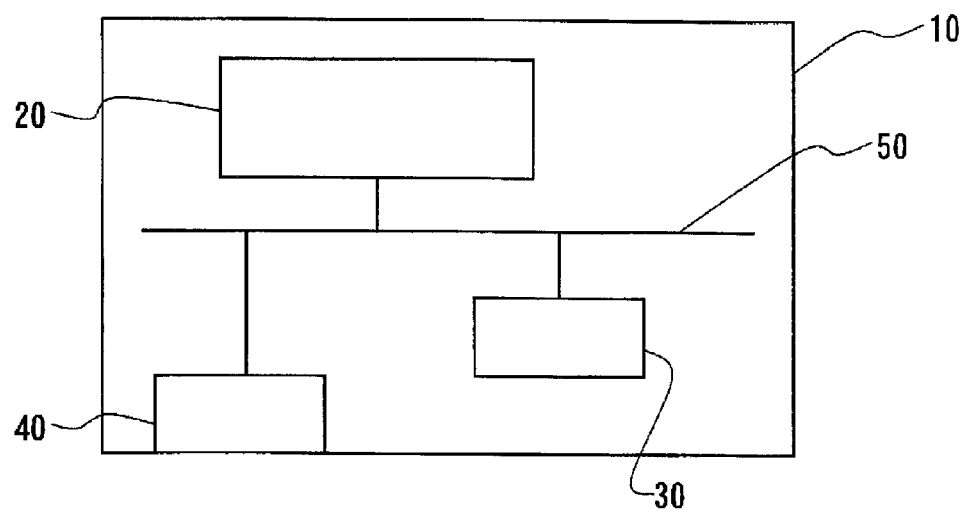
FIG. 3 is a block diagram of an arithmetic operation device for exponentiation.

That is, as shown in FIG. 3, an arithmetic operation part 20 constituting of arithmetic operation circuits may be formed and also a memory part 30 constituting of registers for storing various data required for arithmetic operations may be formed on a semiconductor substrate 10, initial conditions inputted through input/output part 40 may be stored in the required registers in the memory part 30, and the arithmetic operations may be started to enable a result of the arithmetic operation to be output through input/output part 40. In FIG. 3, numeral 50 denotes a data bus.

In the memory part 30, registers which store values of temporary data and registers which store results of multiplication of predetermined temporary data are provided and other registers which store appropriate data are provided besides these registers.

In this way, further speeding up of arithmetic operations can be achieved by implementing a semiconductor device for multiplication processing. And the semiconductor device for multiplication processing may be, instead of being a semiconductor device per se, incorporated into a portion of other semiconductor devices such as a semiconductor device for multiplication processing for encryption and decryption.

Embodiment 3 of the Exponentiation

Next, another arithmetic operation method and arithmetic operation device according to the embodiment of the present invention is explained. The embodiment further reduces the required number of multiplications compared with the embodiments described above. To be more specific, In performing a exponentiation $A^n$ of an element A of an extension field $F_p^m$ of characteristic p and extension degree m, using the [E39] which is a p-adic representation of the exponent n, the exponentiation represented by the [E40] is performed by the Frobenius map. Here, the exponent is assumed to be expanded as follows.

$$n = n_3 p^3 + n_2 p^2 + n_1 p + n_0$$

Here, $A^{n_0} = Y_0, A^{n_1} = Y_1, A^{n_2} = Y_2, A^{n_3} = Y_3$ are assumed. (Note: $A^{n_0}$ denotes A to the power of exponent $n_0$, $A^{n_1}$ denotes A to the power of exponent $n_1$, $A^{n_2}$ denotes A to the power of exponent $n_2$, and $A^{n_3}$ denotes A to the power of exponent $n_3$ respectively.)

Now, it is assumed that there are #Y elements $Y_0, Y_1, \ldots, Y_{\#Y-1}$, and each element is a combination of all the appropriate number of elements given from a set $\{X_0, X_1, \ldots, X_{\#X-1}\}$ with an operator ·. Here, all of the $Y_0, Y_1, \ldots, Y_{\#Y-1}$ are obtained from the set $\{X_0, X_1, \ldots, X_{X-1}\}$ at high speed.

Hereinafter, as one example, a method of obtaining $Y_0, Y_1, Y_2, Y_3$ which are shown in the following expressions (1a) to (1d) with respect to a set $\{X_0, X_1, \ldots, X_{14}\}$ is explained. Usually, 26 multiplications are required to obtain $Y_0, Y_1, Y_2, Y_3$. In contrast, in this embodiment, the number of multiplications can be reduced to 18 as described later.

[E52]

$$Y_0 = X_1 \cdot X_3 \cdot X_5 \cdot X_7 \cdot X_9 \cdot X_{11} \cdot X_{13} \tag{1a}$$

$$Y_1 = X_1 \cdot X_2 \cdot X_6 \cdot X_7 \cdot X_{11} \cdot X_{12} \tag{1b}$$

$$Y_2 = X_0 \cdot X_1 \cdot X_4 \cdot X_5 \cdot X_8 \cdot X_9 \cdot X_{12} \cdot X_{13} \tag{1c}$$

$$Y_3 = X_0 \cdot X_1 \cdot X_2 \cdot X_6 \cdot X_7 \cdot X_8 \cdot X_{12} \cdot X_{13} \cdot X_{14} \tag{1d}$$

In expressions (1c) and (1d), when obtaining $Y_2, Y_3$, the same element $X_0$ is combined. Similarly, when obtaining all of the $Y_0, Y_1, Y_2, Y_3$, there are cases where the same element is combined. Accordingly, by defining components $C_{0001}, \ldots, C_{1111}$ which are temporary data as in the following expression (2a) to (2e), $Y_0, Y_1, Y_2, Y_3$ can be obtained as expressions (3a) to (3d). However, subscripts of components, in order from below, are 1, if necessary for obtaining $Y_0, Y_1, Y_2, Y_3$ and 0, if not necessary.

| | | | |
|---|---|---|---|
| $C_{0001} = X_3$, | $C_{0010} = 1$, | $C_{0011} = X_{11}$ | (2a) |
| $C_{0100} = X_4$, | $C_{0101} = X_5 \cdot X_9$, | $C_{0110} = 1$ | (2b) |
| $C_{0111} = 1$, | $C_{1000} = X_{14}$, | $C_{1001} = 1$ | (2c) |
| $C_{1010} = X_2 \cdot X_6$, | $C_{1011} = X_7$, | $C_{1100} = X_0 \cdot X_8$ | (2d) |
| $C_{1101} = X_{13}$, | $C_{1110} = X_{12}$, | $C_{1111} = X_1$ | (2e) |

[E54]

$$Y_0 = C_{0001} \cdot C_{0011} \cdot C_{0101} \cdot C_{0111} \cdot C_{1001} \cdot C_{1011} \cdot C_{1101} \cdot C_{1111} \tag{3a}$$

$$Y_1 = C_{0010} \cdot C_{0011} \cdot C_{0110} \cdot C_{0111} \cdot C_{1010} \cdot C_{1011} \cdot C_{1110} \cdot C_{1111} \tag{3b}$$

$$Y_2 = C_{0100} \cdot C_{0101} \cdot C_{0110} \cdot C_{0111} \cdot C_{1100} \cdot C_{1101} \cdot C_{1110} \cdot C_{1111} \tag{3c}$$

$$Y_3 = C_{1000} \cdot C_{1001} \cdot C_{1010} \cdot C_{1011} \cdot C_{1100} \cdot C_{1101} \cdot C_{1110} \cdot C_{1111} \tag{3d}$$

In expressions (3a) and (3b), when obtaining $Y_0, Y_1$, there has occurred the same combination $C_{0011} \cdot C_{0111} \cdot C_{1011} \cdot C_{1111}$. This $C_{0011} \cdot C_{0111} \cdot C_{1011} \cdot C_{1111}$ becomes a combination of components multiplied in common when obtaining $Y_0, Y_1$. In other case as well, when obtaining $Y_2, Y_3$, there has occurred the same combination $C_{1100} \cdot C_{1101} \cdot C_{1110} \cdot C_{1111}$. Similarly, this $C_{1100} \cdot C_{1101} \cdot C_{1110} \cdot C_{1111}$ becomes a combination of components multiplied in common when obtaining $Y_2, Y_3$. Accordingly, by performing combinations of components as shown in T1, all of the $Y_0, Y_1, Y_2, Y_3$ can be obtained. Here, * is a special character which matches both 0 and 1.

| Stage 0 | Stage 1 | Stage 2 |
|---|---|---|
| Calculate $C_{0001}$: $C_{1111}$ | $C_{01} = C_{0001} \cdot C_{0101} \cdot C_{1001} \cdot C_{1101}$ | $Y_0 = C_{01} \cdot C_{**11}$ |
| | $C_{10} = C_{0010} \cdot C_{0110} \cdot C_{1010} \cdot C_{1110}$ | $Y_1 = C_{10} \cdot C_{**11}$ |
| | $C_{**11} = C_{0011} \cdot C_{0111} \cdot C_{1011} \cdot C_{1111}$ | |
| | $C_{01**} = C_{0100} \cdot C_{0101} \cdot C_{0110} \cdot C_{0111}$ | $Y_2 = C_{01**} \cdot C_{11**}$ |
| | $C_{10**} = C_{1000} \cdot C_{1001} \cdot C_{1010} \cdot C_{1011}$ | $Y_3 = C_{10**} \cdot C_{11**}$ |
| | $C_{11**} = C_{1100} \cdot C_{1101} \cdot C_{1110} \cdot C_{1111}$ | |

In addition, each component $C_{0010}, C_{0010}, C_{0010}, C_{0010}$ which equals 1 in expressions (3a) to (3d), is not necessary to be combined. Therefore, actual combination of components is as shown in [T2].

| Stage 0 | Stage 1 | Stage 2 |
|---|---|---|
| Calculate | $C_{01} = C_{0001} \cdot C_{0101} \cdot C_{1101}$ | $Y_0 = C_{01} \cdot C_{**11}$ |
| $C_{0001}, \ldots,$ | $C_{10} = C_{1010} \cdot C_{1110}$ | $Y_1 = C_{10} \cdot C_{**11}$ |
| $C_{0001}$ | $C_{**11} = C_{0011} \cdot C_{1011} \cdot C_{1111}$ | |
| except | $C_{01**} = C_{0100} \cdot C_{0101}$ | $Y_2 = C_{01**} \cdot C_{11**}$ |
| $C_{0010}, C_{0110},$ | $C_{10**} = C_{1000} \cdot C_{1010} \cdot C_{1011}$ | $Y_3 = C_{10**} \cdot C_{11**}$ |
| $C_{0111}, C_{1001}$ | $C_{11**} = C_{1100} \cdot C_{1101} \cdot C_{1110} \cdot C_{1111}$ | |

As described above, by obtaining $Y_0, Y_1, Y_2, Y_3$ the number of multiplications can be reduced from 26 to 18. That is, according to another arithmetic operation method and arithmetic operation device in the embodiment of the present invention, required number of multiplication can be further reduced.

Embodiment 4 of the Exponentiation

Next, an explanation is made using general expression. In the case where $\log_2$ (#Y) is integer (#Y=2Y(y: integer)) $Y_0, Y_1, \ldots, Y_{\#Y-1}$, can be systematically obtained by performing combination of components from a set $\{X_0, X_1, \ldots, X_{\#X-1}\}$ and operator · separately at each stage as shown in [T3]. Here, $H = \log_2(\#X)$ is assumed.

[T3]

| Stage 0 | Stage 1 | Stage 2 | ... | Stage H |
|---|---|---|---|---|
| Buffer 0 | Buffer 0 | Buffer 0 | | |
| Calculate | Calculate | Calculate | | $Y_0 =$ |
| $C_{\underbrace{0\ldots1}_{\#Y}}$ | $C_{\underbrace{*\ldots*}_{\#Y/2}\underbrace{0\ldots1}_{\#Y/2}}$ | $C_{\underbrace{*\ldots*}_{\#Y/4}\underbrace{*\ldots*}_{\#Y/4}\underbrace{*\ldots*}_{\#Y/4}\underbrace{0\ldots1}_{\#y/4}}$ | | $C_{\underbrace{*\ldots*}_{\#Y-2}01} \cdot C_{\underbrace{*\ldots*}_{\#Y-2}11}$ |
| $\vdots$ | $\vdots$ | $\vdots$ | | |
| $C_{\underbrace{1\ldots1}_{\#Y}}$ | $C_{\underbrace{*\ldots*}_{\#Y/2}\underbrace{1\ldots1}_{\#Y/2}}$ | $C_{\underbrace{*\ldots*}_{\#Y/4}\underbrace{*\ldots*}_{\#Y/4}\underbrace{*\ldots*}_{\#Y/4}\underbrace{1\ldots1}_{\#y/4}}$ | | |
| | Buffer 1 | | | |
| | Calculate | | | |
| | $C_{\underbrace{*\ldots*}_{\#Y/4}\underbrace{*\ldots*}_{\#Y/4}\underbrace{0\ldots1}_{\#Y/4}\underbrace{*\ldots*}_{\#y/4}}$ | | | |
| | $\vdots$ | | | |
| | $C_{\underbrace{*\ldots*}_{\#Y/4}\underbrace{*\ldots*}_{\#Y/4}\underbrace{1\ldots1}_{\#Y/4}\underbrace{*\ldots*}_{\#y/4}}$ | | | |
| | Buffer 1 | Buffer 2 | ... | |
| | Calculate | Calculate | | |
| | $C_{\underbrace{0\ldots1}_{\#Y/2}\underbrace{*\ldots*}_{\#Y/2}}$ | $C_{\underbrace{*\ldots*}_{\#Y/4}\underbrace{0\ldots1}_{\#Y/4}\underbrace{*\ldots*}_{\#Y/4}\underbrace{*\ldots*}_{\#Y/4}}$ | | |
| | $\vdots$ | $\vdots$ | | |
| | $C_{\underbrace{1\ldots1}_{\#Y/2}\underbrace{*\ldots*}_{\#Y/2}}$ | $C_{\underbrace{*\ldots*}_{\#Y/4}\underbrace{1\ldots1}_{\#Y/4}\underbrace{*\ldots*}_{\#Y/4}\underbrace{*\ldots*}_{\#Y/4}}$ | | |
| | | Buffer 3 | | |
| | | Calculate | | |
| | | $C_{\underbrace{0\ldots1}_{\#Y/4}\underbrace{*\ldots*}_{\#Y/4}\underbrace{*\ldots*}_{\#Y/4}\underbrace{*\ldots*}_{\#y/4}}$ | | $Y_{\#Y-1} =$ |
| | | $\vdots$ | | $C_{10\underbrace{*\ldots*}_{\#Y-2}} \cdot C_{11\underbrace{*\ldots*}_{\#Y-2}}$ |
| | | $C_{\underbrace{1\ldots1}_{\#Y/4}\underbrace{*\ldots*}_{\#Y/4}\underbrace{*\ldots*}_{\#Y/4}\underbrace{*\ldots*}_{\#y/4}}$ | | |

At Stage 1 of [T3], in the case where $2^{\#Y}-1 > \#X$, there is no need to make $2^{\#Y}-1$ components, but there is only need to make #X components. In addition, since only the necessary components are made at Stage 0, number of multiplications required for combination of components from stage 1 to stage H can be reduced. However, in the case where #Y is too large compared with #X, since tendency of the subscripts is dispersed, almost no combination is performed at an early stage, and hence, wasteful processing is increased.

To solve this problem, letting #Y=G·E ($\log_2(G)$, $\log_2(E)$: integer), grouping is performed as in expression (4). The combination of components in this case is shown in [T4]. Here, $H = \log_2(E)$.

[E55]

$$Y_0, Y_1, \ldots, Y_{\#Y-1} \rightarrow \{Y_0, Y_1, \ldots, Y_{E-1}\}, \quad (4)$$
$$\{Y_E, Y_{E+1}, \ldots, Y_{2E-1}\}, \ldots, \{Y_{G\cdot E-E}, Y_{G\cdot E\cdot(E-1)}, \ldots, Y_{G\cdot E-1}\}$$

[T4]

| Group | Stage 0 | Stage 1 | ... | Stage H |
|---|---|---|---|---|
| | Buffer 0 | Buffer 0 | | |
| 0 | Calculate | Calculate | | $Y_0 = C_{\underbrace{*\ldots*}_{E-2}01} \cdot C_{\underbrace{*\ldots*}_{E-2}11}$ |
| | $C_{\underbrace{0\ldots1}_{E}}$ | $C_{\underbrace{*\ldots*}_{E/2}\underbrace{0\ldots1}_{E/2}}$ | | |
| | $\vdots$ | $\vdots$ | | |
| | $C_{\underbrace{1\ldots1}_{E}}$ | $C_{\underbrace{*\ldots*}_{E/2}\underbrace{1\ldots1}_{E/2}}$ | | |
| | | Buffer 1 | | |
| | | Calculate | ... | |
| | | $C_{\underbrace{0\ldots1}_{E/2}\underbrace{*\ldots*}_{E/2}}$ | | $Y_{E-1} = C_{10\underbrace{*\ldots*}_{E-2}} \cdot C_{11\underbrace{*\ldots*}_{E-2}}$ |
| | | $\vdots$ | | |
| | | $C_{\underbrace{1\ldots1}_{E/2}\underbrace{*\ldots*}_{E/2}}$ | | |
| . | | | | . |
| . | | | | . |
| | Buffer 0 | Buffer 0 | | |
| Group (G-1) | Calculate | Calculate | | $Y_{G\cdot E-E} = C'_{\underbrace{*\ldots*}_{E-2}01} \cdot C'_{\underbrace{*\ldots*}_{E-2}11}$ |
| | $C'_{\underbrace{0\ldots1}_{E}}$ | $C'_{\underbrace{*\ldots*}_{E/2}\underbrace{0\ldots1}_{E/2}}$ | | |
| | $\vdots$ | $\vdots$ | | |
| | $C'_{\underbrace{1\ldots1}_{E}}$ | $C'_{\underbrace{*\ldots*}_{E/2}\underbrace{1\ldots1}_{E/2}}$ | | |
| | | Buffer 1 | | |
| | | Calculate | | |
| | | $C'_{\underbrace{0\ldots1}_{E/2}\underbrace{*\ldots*}_{E/2}}$ | | $Y_{G\cdot E-1} = C'_{10\underbrace{*\ldots*}_{E-2}} \cdot C'_{11\underbrace{*\ldots*}_{E-2}}$ |
| | | $\vdots$ | | |
| | | $C'_{\underbrace{1\ldots1}_{E/2}\underbrace{*\ldots*}_{E/2}}$ | | |

Embodiment 5 of the Exponentiation

Accordingly, an exponentiation can be performed by an electronic computer such as a personal computer using a program based on a flowchart described later. In addition, this program is generally used as a subroutine program for exponentiation in the programs for multiplication in an extension field in the case of encryption or decryption. Hereinafter, an algorithm for #Y exponentiations with identical bases is explained.

Here, letting the identical base to be $A, Y_0, Y_1, \ldots, Y_{G \cdot E-1}$ respectively become as follows.

$$A^{n0}, A^{n1}, \ldots, A^{nG \cdot E-1} (Y_i \in \mathbb{F}, n_i \in \mathbb{Z}) \quad [\text{E56}]$$

And $X_0, X_1, \ldots, X_{\#X-1}$ respectively become $A, A^2, \ldots, A^{2^{\#X-1}}$ (Note: $A^{2^{\#X-1}}$ denotes A to the power of exponent $2^{\#X-1}$). Here, $\#X = \text{Flr}(\log_2(\max(n_i))) + 1$.

Figure 4:
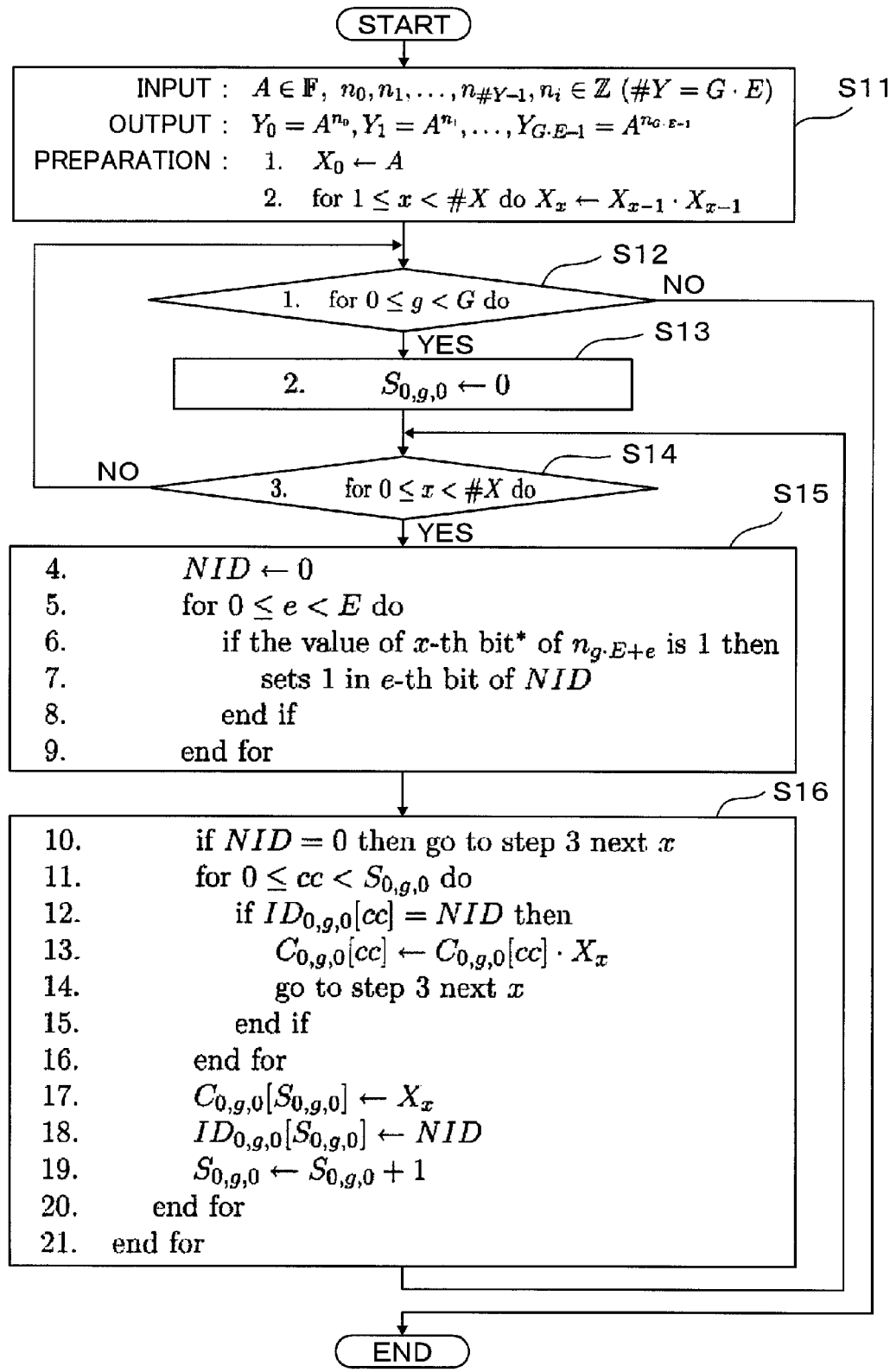
FIG. 4 is a flowchart of another arithmetic operation program for exponentiation (processing at stage 0)

First, with respect to an arithmetic operation program for exponentiation, an explanation of a processing at Stage 0 is explained. FIG. 4 is a flowchart of another arithmetic operation program for exponentiation, and shows a processing at Stage 0 shown in [T4]. Firstly, with reference to FIG. 4 an electronic computer sets initial conditions for exponentiation (step S11). This step is a preliminary step, and to be more specific, the followings are prepared from A.

$$X_0 = A, X_1 = A^2, X_2 = A^{2^2}, \ldots, X_{\#X-1} = A^{2^{\#X-1}} \quad [\text{E57}]$$

In the following explanation, an array $C_{a,b,c}$ is used as a buffer for storing components. A subscript a denotes stage number, b denotes group number, and c denotes buffer number respectively. In addition, an array ID is used as a buffer for storing a subscript (ID) of the component which stores a value at the array C. And hence, an array index of C and an array index of ID correspond to each other. Subscripts are as similar as the array C. And a variable S is used for counting total number of components stored in the array C (size of array C). Subscripts are as similar as the array C.

Next, the electronic computer, in order to perform a processing for each group (step S13 to S16 described later) (step S12), initializes S which is a buffer used at Stage 0 and group g along with the processing (step S13).

Next, the electronic computer, in order to sequentially perform processing of $X_0, X_1, \ldots, X_{\#X-1}$ which are obtained in the preliminary step of step S11 (step S14), obtains an ID (NID: New ID) which combines $X_X$ (step S15).

Next, the electronic computer combines a component corresponding to ID (NID) obtained in step S15 with $X_X$ (step S16). However, when ID is zero, since there is no need to generate a component, the processing is skipped (attached number 10 in step S16). To be more specific, searching for a component if it has the same ID as NID and is already stored in the buffer is performed (loop ranging from attached number 11 to attached number 16 in step S16) and when the component is stored in the buffer (attached number 12 in step S16), the component having the ID is combined with $X_X$ (attached number 13 in step S16). On the other hand, when the component is not stored in the buffer, a size of the buffer is extended (attached number 19 in step S16), a new component ($C_{0,g,0}[S_{0,g,0}]$) inputted with X, is generated (attached number 17 in step S16), and is inputted in the buffer (attached number 18 in step S16).

Figure 5:
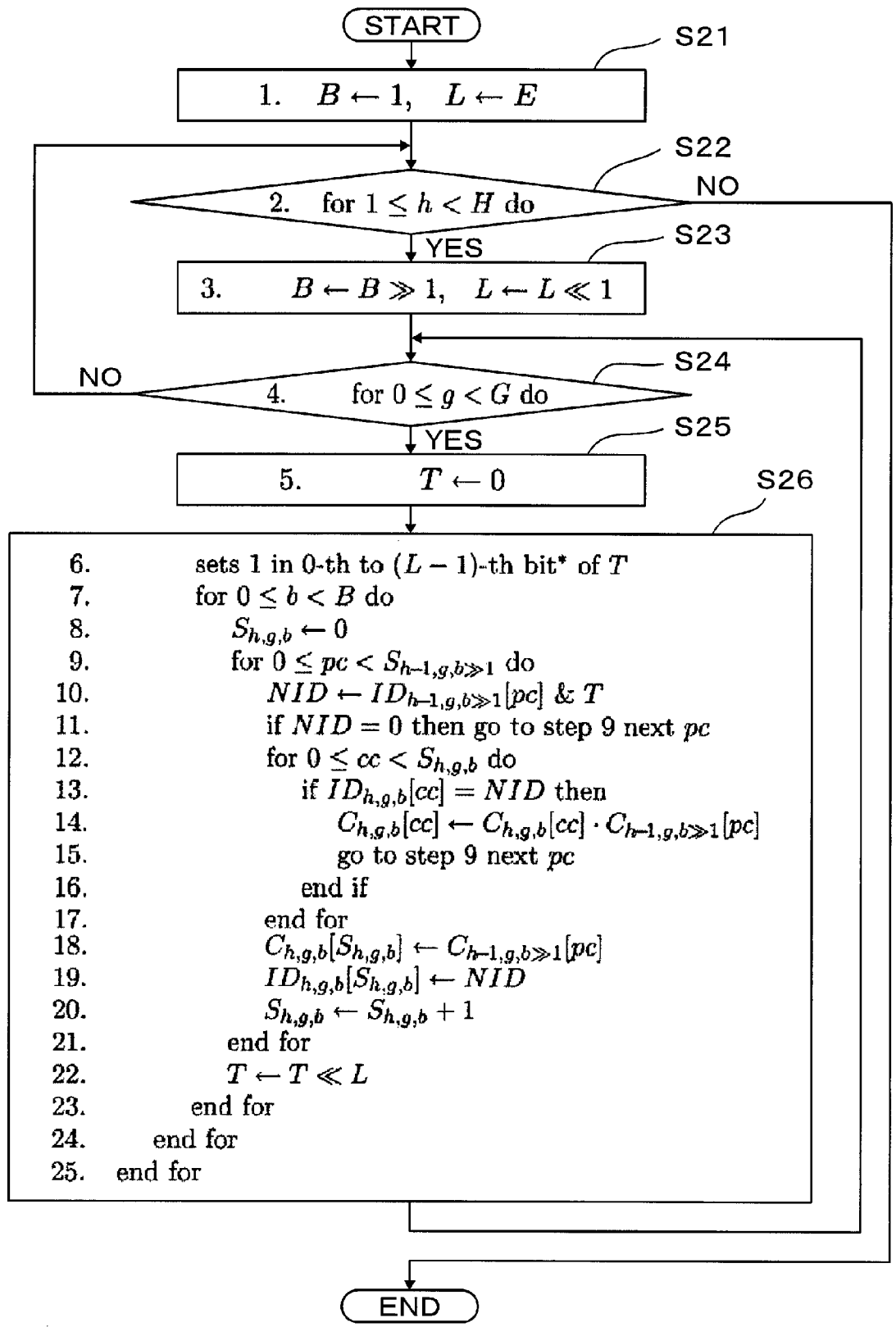
FIG. 5 is a flowchart of another arithmetic operation program for exponentiation (processing at stages 1 to (H−1))

Next, with respect to an arithmetic operation program for exponentiation, processing ranging from Stage 1 to Stage (H−1) is explained. FIG. 5 is a flowchart of another arithmetic operation program for exponentiation, and shows processing ranging from Stage 1 to Stage (H−1) shown in [T4]. In the following explanation, a variable B is used to hold total number of buffers which are prepared for each group at Stage g. And a variable L is used to hold a length of component ID (except *) at Stage g.

$$C_* \ldots *\underbrace{0 \ldots 1}_{L}* \ldots * \quad [\text{E58}]$$

In addition, a variable T is used to reference the component ID. At Stage 1 to the final Stage H, it is necessary to reference the component ID in the previous stage when making components at each stage. For example, assuming component $C_{01101110}$ has been made at Stage 0, since the ID of $C_{01101110}$ can be referenced at Stage 1 as shown below, it is necessary to make $C_{****1110}$.

$$C_{0110\underline{1110}} \atop L=4 \quad [\text{E59}]$$

Moreover, since the ID can be referenced with a reference position shifted L bits as shown below, it is necessary to make $C_{0110****}$.

$$C\ \boxed{0110}\ 1110 \atop L=4 \quad [\text{E60}]$$

The variable T is used to reference these IDs.

With reference to FIG. 5, first, the electronic computer initializes values of B and L (step S21). And, in order to perform processing for each stage ranging from Stage 1 to Stage (H−1) (step S23 to step S26 described later) (step S22), the values of B and L are updated along with the processing (step S23).

Next, the electronic computer, in order to perform processing for each group (step S25, step S26 described later) (step S24), initializes T to enable to reference lower L bits of ID along with the processing (step S25), and perform processing for each group and for each buffer at Stage H.

In addition, the electronic computer, when performing processing for each buffer (loop ranging from attached number 7 to attached number 23 in step S26) with respect to T initialized in step 25, updates the value of T to shift the reference position of ID by a unit of L bits (attached number 22 in step S26). And, the electronic computer initializes S which is a buffer in stage h, group g, and buffer b (attached number 8 in step S26). And, the electronic computer sequentially performs processing with respect to all components in the previous stage necessary for making $C_{h,g,b}$ (attached number 9 to attached number 21 in step S26). And the electronic computer references component ID in the previous stage using T (attached number 10 in step S26).

Further, the electronic computer combines or inputs component corresponding to reference ID (NID) at attached number 10 in step S26 (attached number 11 to attached number 20 in step S26). However, when ID is 0, since there is no need to generate a component, the processing is skipped (attached number 11 in step S26).

Further, the electronic computer searches for a component if there is a component whose ID is the same as ID (NID) as in attached number 10 to attached number 15 in step S26 (loop ranging from attached number 12 to attached number 17 in step S26). When the component is stored in the buffer (attached number 13 in step S26), the electronic computer combines the component having the ID with a component in the previous stage (attached number 14 in step S26). On the other hand, when the component is not stored in the buffer, the electronic computer extends a size of the buffer (attached number 20 in step S26), generate a new component ($C_{h,g,b}$ [$S_{h,g,b}$]) inputted with a value of $X_X$ (attached number 18 in step S26), and inputs it into the buffer (attached number 19 in step S26).

Figure 6:
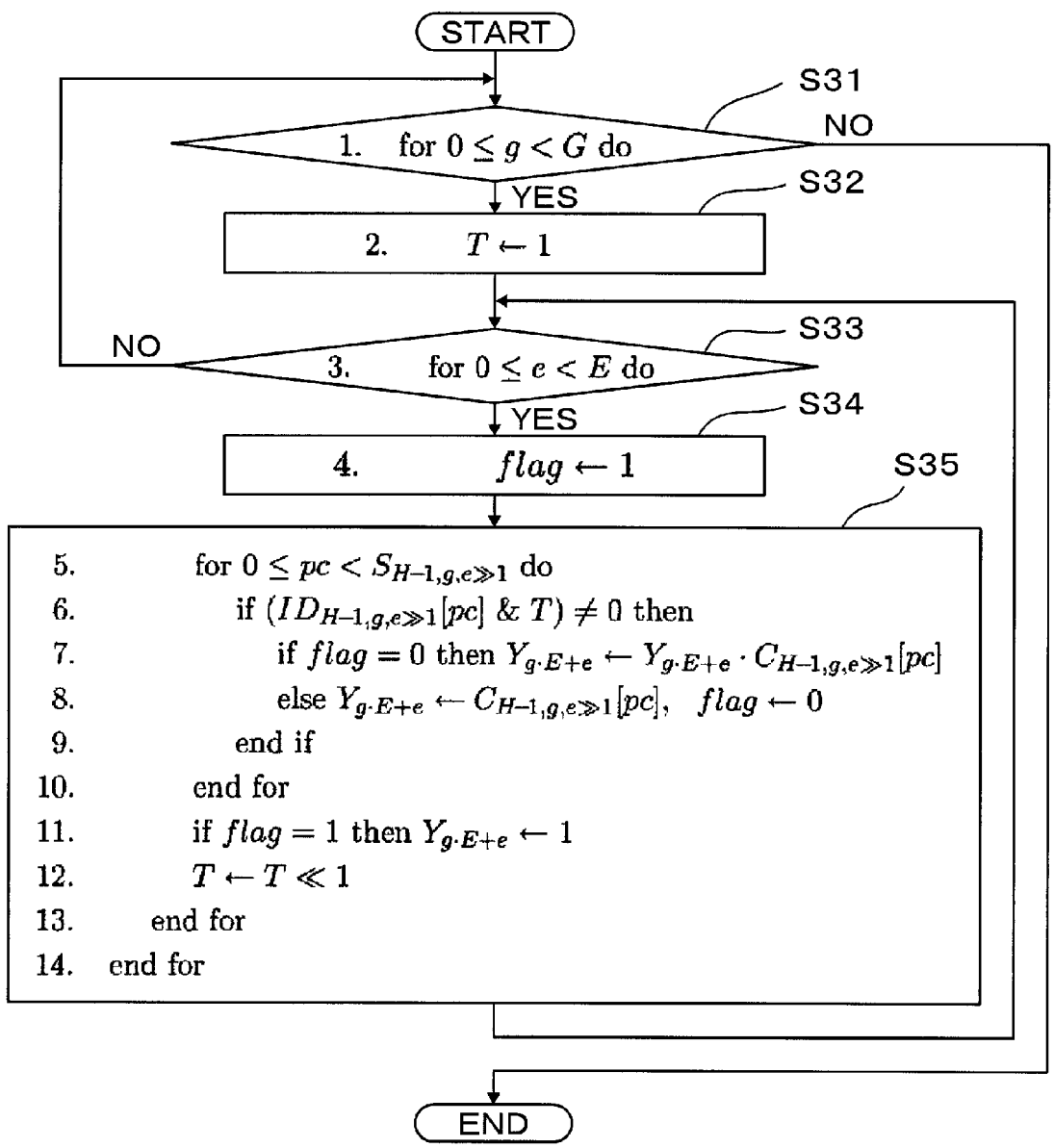
FIG. 6 is a flowchart of another arithmetic operation program for exponentiation (processing at stage H)

Next, with respect to an arithmetic operation program for exponentiation, processing at Stage H is explained. FIG. 6 is a flowchart of another arithmetic operation program for exponentiation, and shows processing at Stage H shown in [T4]. The electronic computer, in order to perform processing for each group (step S32 to step S35 described later) (step S31), sets T to be 1 along with the processing (step S32).

Next, the electronic computer, in order to perform each output processing (step S34, step S35 described later) (step S33), set flag to be 1 along with the processing (step S34). At Stage P which is the final stage, since there is only need to reference the component ID at the previous Stage (H−1) by 1 bit, the electronic computer sets T to be 1 in step S32. And, when performing processing for each buffer (loop ranging from attached number 3 to attached number 13 in step S33 to step S35), the electronic computer updates a value of T to shift the reference position of ID by a unit of 1 bit (attached number 12 in step S35).

At stages before the final Stage H, components which are not inputted or combined can be omitted. However, at the final Stage H, output Y must be inputted with a value. Therefore, in this algorithm, a variable "flag" is used as a flag in order to determine whether or not output Y is combined or inputted with a component at stage (H−1). The electronic computer initializes a flag "flag" in step S34, and searches for a component at Stage (H−1) to be combined or inputted into output $Y_{g \cdot E+e}$ (loop ranging from attached number 5 to attached number 10 in step S35), and when the component is present, combines a value of the component with output $Y_{g \cdot E+e}$ (attached number 7 in step S35), or inputs a value of the component to output $Y_{g \cdot E+e}$ and changes a value of flag "flag" (attached number 8 in step S35). On the other hand, when the component is not present (in the case where a value of flag is a initial value), output $Y_{g \cdot E+e}$ is inputted with 1 (attached number 11 in step S35).

Due to such an arithmetic operation for exponentiation, the number of multiplications can be reduced and hence, an arithmetic operation speed can be increased.

Further, an arithmetic operation for exponentiation in this embodiment may be implemented by semiconductor device for multiplication processing which is formed on a semiconductor substrate as an arithmetic processing circuit as shown in FIG. 3.

<Scalar Multiplication>

Next, an explanation is made with respect to an arithmetic operation method for scalar multiplication and an arithmetic operation device for scalar multiplication according to an embodiment of the present invention. In elliptic curve cryptography, scalar multiplication which adds the same elements plural times is frequently used. However, since scalar multiplication performs addition of large numerical value of 250 bit class at a time, the scalar multiplication costs too much when performed in the usual way. In the present invention, there is disclosed an algorithm which speeds up this scalar multiplication. Hereinafter, an elliptic curve addition, a scalar multiplication, a binary method, the Frobenius map of a rational point on an elliptic curve, and property which rational points satisfy are explained and an embodiment of the present invention is explained in detail.

(Elliptic Addition)

First, an algorithm for fast scalar multiplication is explained. Generally, an elliptic curve over a finite field $F_p$ (a field of characteristic p) is defined by expression (5).

[E61]

$$E(x,y) = x^3 + ax + b - y^2 = 0, a, b \in \mathbb{F}_p \quad (5)$$

It is assumed that a field $F_p$ to which a, b belong is called a coefficient field, a field $F_p^m$ to which variables x, y belong is called a definition field, E/F denotes an elliptic curve whose coefficient field is $F_p$, and E ($F_p^m$) denotes an elliptic curve whose definition field is $F_p^m$ (extension field $F_p$ of degree m).

All of the combination of (x, y) which satisfies expression (5) adding a point at infinity are called rational points on an elliptic curve E(x, y), and with respect to rational points P x1, y1) and Q ($x_2$, $y_2$), the following arithmetic operation is defined. A method of generating a rational point R($x_3$, $y_3$) by this arithmetic operation is called elliptic addition.

[E62]

$$\lambda = \begin{cases} \dfrac{y_2 - y_1}{x_2 - x_1} & (P \neq Q) \\ \dfrac{3x_1^2 + a}{2y_1} & (P = Q) \end{cases} \quad (6)$$

$$x_3 = \lambda^2 - x_1 - x_2 \quad (7)$$

$$y_3 = \lambda(x_1 - x_3) - y_1 \quad (8)$$

In this case, the rational point which becomes P when elliptic addition with any rational point P is performed, such as "0" in integer addition, is assumed to be a point at infinity O. That is, P+O=O+P=P. A rational point P becomes a point at infinity, when elliptic addition is performed with a rational point −P which is symmetrical to x axis. This −P is called an inverse element of P. Hereinafter, a description is given by taking the elliptic curve in expression (5) as an example.

(Scalar Multiplication)

Scalar multiplication means adding up the same rational point plural times by elliptic addition. For example, [n]A means adding up A n times. In addition, assuming the total number of rational points on the elliptic curve of expression (5) to be #E($F_p^m$), any rational point A has the following property.

$$[\#E(\mathbb{F}_{p^m})]A = \mathcal{O} \quad [\text{E63}]$$

It is an elliptic curve cryptography that takes skillful advantage of this property (cyclic nature).

(Binary Method)

A binary method is a technique that efficiently performs a scalar multiplication [n]A as follows.

[T5]

| Algorithm 1 (Binary method) |
| --- |
| Input A, n |
| Output X |
| 1. X ← $\mathcal{O}$, B ← A |
| 2. if n = 0, then output X |
| 3. else, then |
| 4.    if (n & 1) = 1, then X ← X + B |
| 5.    n ← n >> 1 |

-continued

Algorithm 1 (Binary method)

```
6.    if n = 0, then output X
7.    B ← B + B
8.    if (n & 1) = 1, then X ← X + B
9.    go to Step.5
10. end else
```

The binary method requires in average Flr($\log_2$(n)) times of elliptic doublings (elliptic addition to itself once) and {Flr($\log_2$(n))+1}/2 times of elliptic additions. Here, >> denotes a bit shift operator to the right and for example, $(1011)_2$>>1 is $(101)_2$. In addition, & denotes a logical product and for example, $(1011)_2$ &1 is 1, and $(110)_2$ &1 is 0.

(Window Method)

A window method is a technique that efficiently performs scalar multiplication as follows.

[E64]

$$[2]A, [3]A, [4]A, \ldots, [7]A \quad (9)$$

These correspond to the following binary numbers.

[E65]

$$2=(010)_2, 3=(011)_2, 4=(100)_2, \ldots, 7=(111)_2 \quad (10)$$

Using these, for example, scalar multiplication [318]A is performed as the following expression.

[E66]

$$[318]A = [(100111110)_2]A = \{[2^3]([(100)_2]A)[2^3]([(111)_2]A)\}[(110)_2]A \quad (11)$$

Except for the calculation for preparing components, the window method requires Flr($\log_2$(n))−w+1 times of elliptic doublings and [{Flr($\log_2$(n))+1}/w]{1−(½)$^w$} times of elliptic additions in average.

(The Frobenius Map of Rational Point on Elliptic Curve)

The Frobenius map of a rational point P=(x, y) on an elliptic curve E($F_p^m$) is represented as φ(P) and performs the following arithmetic operation.

$$\phi(P)=(x^p, y^p) \quad [E67]$$

That is, an arithmetic operation that x and y in P are powered by p is performed. Here, x and y are included in a finite field $F_p^m$ (m-th extension field of $F_p^m$, m is an integer greater than or equal to 1). In this case, $p^k$-th power (here, k is an integer greater than or equal to 0) can be performed at far higher speed than in the case of powering operation with other integers.

(Property that Rational Point Satisfies)

An arbitrary rational point P=(x, y) on an elliptic curve E($F_p^m$) necessarily satisfies the following expression (12).

[E68]

$$(\phi^2 - t\phi + p)P = \mathcal{O} \quad (12)$$

In this case, t=p+1−##E($F_p$) and $\phi^2$ performs the Frobenius map twice, that is, it means an operation below.

[E69]

$$\phi^2(P) = (x^{p^2}, y^{p^2}) \quad (13)$$

Here, the expression (12), after being transformed and rearranged, leads to the following expression.

[E70]

$$[p]P = (t\phi - \phi^2)P \quad (14)$$
$$= [t]\{\phi(P)\} + \{-\phi^2(P)\}$$

That is, addition of P to itself p times (p times multiplication) means that elliptic addition of an inverse element of second iterate of the Frobenius map of P to the Frobenius map of P multiplied by t. Furthermore, an arbitrary rational point P on the elliptic curve E($F_p^m$) necessarily satisfies the following expression (15).

[E71]

$$\phi^m(P)=P \quad (15)$$

This means $$(x^{p^m}, y^{p^m})=(x,y)=P \quad [E72]$$

Next, a case where scalar multiplication [n]A (where, A is an arbitrary rational point on E($F_p^m$)) according to the present invention is explained.

Embodiment 1 of Scalar Multiplication (Arithmetic Operation by ψ-Adic Expansion)

Considering endomorphism ψ which is rapidly computable, an arithmetic operation by ψ-adic expansion which is isomorphic to n times multiplication as in expression (16) is obtained.

[E73]

$$n = \sum_{i=0}^{s} n_i \psi^i \quad (16)$$

Using this, the following expression is given.

[E74]

$$[n]A = \sum_{i=0}^{s} \{\psi^i([n_i]A)\} \quad (17)$$

In this case, $\psi^i$(A) denotes i-th iterate of operation ψ and since this operation is fast, actually required computation is the part $[n_i]$A.

As a specific example, there exists a ψ-adic expansion using the Frobenius map p which is introduced in the article (Property that rational point satisfies).

Here, n is made p-adic expansion, $$n = \sum_{i=0}^{s} n'_i p^i \quad [E75]$$

and hence, $$[n]A = \sum_{i=0}^{s} \{p^i([n'_i]A)\} \quad [E76]$$

Here, as the right hand side of expression (14) is substituted, there is obtained,

[E77]
$$[n]A = \sum_{i=0}^{s}\{(t\varphi - \varphi^2)^i([n'_i]A)\} \quad (18)$$

What is in parenthesis of summation on the right hand side of expression (18) is

[E78]
$$(t\varphi - \varphi^2)^i[n'_i]A = \sum_{k=0}^{i}\{{}_iC_k[t^k]\varphi^k(-1)^{i-k}\varphi^{2\cdot(i-k)}([n'_i]A)\}$$
$$= \sum_{k=0}^{i}\{{}_iC_k \cdot t^k \cdot n'_i\}(-1)^{i-k}\varphi^{2i-k}(A) \quad (19)$$

Here, in the case where ${}_iC_k \cdot t^k \cdot n'_i$ in expression (19) is greater than p, this coefficient is made p-adic expansion again. That is,

[E79]
$${}_iC_k \cdot t^k \cdot n'_t = \sum_{j=0}^{h}n''_j p^j$$

Then,

[E80]
$$\{{}_iC_k \cdot t^k \cdot n'_t\}(-1)^{i-k}\varphi^{2i-k}(A) = (-1)^{i-k}\varphi^{2i-k}\sum_{j=0}^{h}p^j([n''_j]A)$$
$$= (-1)^{i-k}\varphi^{2i-k}\sum_{j=0}^{h}\{(t\varphi - \varphi^2)^j\}([n''_j]A)$$
$$= (-1)^{i-k}\varphi^{2i-k}\sum_{j=0}^{h}\sum_{l=0}^{j}\{{}_jC_l \cdot t^l \cdot n''_j\}$$
$$(-1)^{j-l}\varphi^{2j-l}(A)$$
$$= \sum_{j=0}^{h}\sum_{l=0}^{i}\{{}_jC_l \cdot t^l \cdot n''_j\}(-1)^{i-k+j-l}$$
$$\varphi^{2(i+j)-(k+l)}(A)$$

Furthermore, in the case where φ's exponent 2(i+j)−(k+l) becomes greater than m, using expression (15), there can be obtained,

[E81]
$$\varphi^{2(i+j)-(k+l)} = \varphi^{2(i+j)-(k+l)-T\cdot m} \cdot \varphi^{T\cdot m}$$
$$= \varphi^{2(i+j)-(k+l)-T\cdot m}$$

(where, T=Flr({2(i+j)−(k+l)}/m), and hence, exponent of φ is kept less than m.

In the following, repeating these p-adic expansion and reduction of the exponent of φ using expression (15), and when all the coefficients of $\varphi^k$ (where, k is greater than or equal to 0 and less than m) become less than p, there can be prepared the expression in which ψ is substituted for φ in expression (17). That is,

[E82]
$$[n]A = \sum_{i=0}^{s}\{\varphi^i([n_i]A)\}$$

Denoting the part $[n_i]A$ in expression (17) as A[i], the following algorithm is given.
[T6]

---

Algorithm 2

Input A, n
Output C
1.  B ← A, s ← (maximum exponent of ψ when n is made ψ-adic expansion), t ← ⌊log₂{max(n_i)}⌋
2.  for 0 ≤ i ≤ s do, A[i] = 𝒪
3.  if n = 0, then output 𝒪
4.  else, then
5.    obtain ψ-adic expansion of n as in expression (17)
6.    for 0 ≤ i ≤ s, do
7.      if (n_i & 1) = 1, then A[i] ← A[i] + B
8.      n_i ← n_i >> 1
9.    end for
10.   for 1 ≤ j ≤ t, do
11.     B ← B + B
12.     for 0 ≤ i ≤ s, do
13.       if (n_i & 1) = 1, then A[i] ← A[i] + B
14.       n_i ← n_i >> 1
15.     end for
16.   end for
17.   C ← A[s]
18.   for s − 1 ≥ j ≥ 0, do
19.     C ← ψ(C), C ← C + A[j]
20.   end for
21.   output C
22. end else

---

This technique requires t times of elliptic doublings, (s+1)(t+1)/2 times of elliptic additions, s times of operations by the Frobenius map, and s times of elliptic additions. By using operation by the Frobenius map, the number of elliptic doublings is reduced, but the number of elliptic additions is unchanged. In order to reduce this number of elliptic additions, the following computation method is considered.

(Specific Explanation of Embodiment 1 of Scalar Multiplication)

In the following, algorithm 2 described above is improved. It is assumed that s=(maximum coefficient of ψ, when n is made ψ-adic expansion) and t=Flr(log₂{max(n_i)}) are 5 and 4 respectively. In addition, it is also assumed that $n_0, n_1, \ldots, n_5$ in binary representation are as follows.

$$n_1=(1001)_2, n_0=(1110)_2, \quad (20a)$$

$$n_3=(1101)_2, n_2=(1110)_2, \quad (20b)$$

$$n_5=(1111)_2, n_4=(0101)_2, \quad (20c)$$

Figure 7:
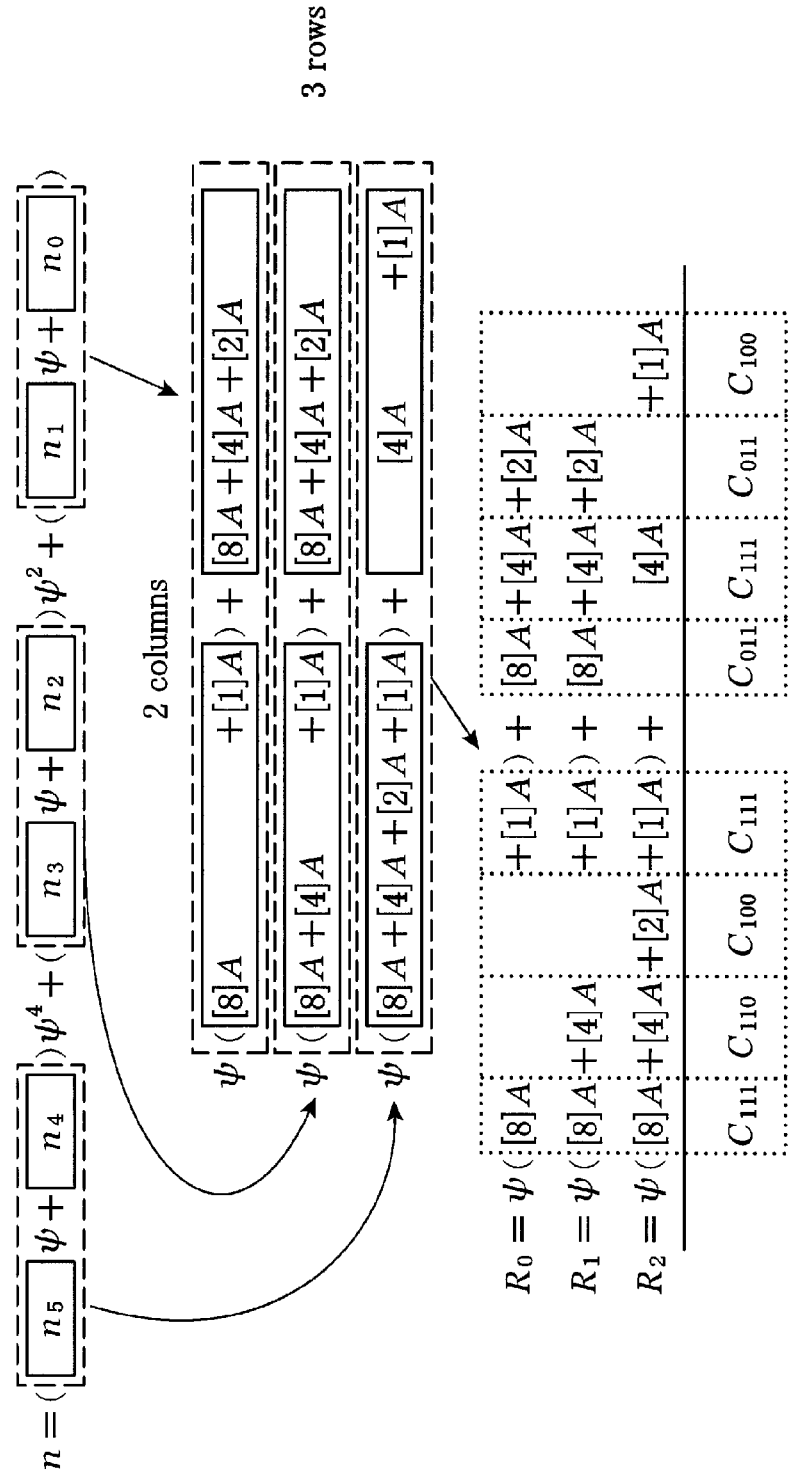
FIG. 7 is an image view showing an image of calculation.

The coefficient n in the scalar multiplication is considered to be divided as follows (see, FIG. 7).

[E83]
$$n=(n_5\psi+n_4)\psi^4+(n_3\psi+n_2)\psi^2+(n_1\psi+n_0) \quad (21)$$

And, considering 2 groups $G_1=\{[n_5]A, [n_3]A, [n_1]A\}$ and $G_1=\{[n_4]A, [n_2]A, [n_0]A\}$, the following computational equations are looked at.

$$[n_1]A=[8]A+[1]A, [n_0]A=[8]A+[4]A+[2]A, \quad (22a)$$

$$[n_3]A=[8]A+[4]A+[1]A, [n_2]A=[8]A+[4]A+[2]A, \quad (22b)$$

$$[n_5]A=[8]A+[4]A+[2]A+[1]A, [n_4]A=[4]A+[1]A, \quad (22c)$$

As seen in expressions (20) and expressions (22), since the computational term only in $[n_5]$ A out of $G_1$ is $[2]A$, and the computational term only in $[n_4]A$ out of $G_2$ is $[1]A$, putting together these computations into $C_{100}$, then $C_{100}=\psi([2]A)+[1]A$ is obtained. Similarly, since there exists no computational terms in $[n_1]$ A and $[n_3]$ A out of $G_2$ and computational terms only in $[n_0]A$ and $[n_2]A$ out of $G_2$ are $[8]A$ and $[2]A$, putting together these terms into $C_{011}$, $C_{011}=[8]A+[2]A$ is obtained. Similarly in other combinations, considering $C_{001}$, $C_{010}, \ldots, C_{111}$ as follows,

[E84]

$$C_{100}=\psi([2]A)+[1]A, C_{010}=\mathcal{O}, C_{001}=\mathcal{O} \quad (23a)$$

$$C_{011}=[8]A+[2]A, C_{101}=\mathcal{O}, C_{110}=\psi([4]A), \quad (23b)$$

$$C_{111}=\psi([8]A+[1]A)+[4]A \quad (23c)$$

[n]A can be calculated as in the following expressions.

[E85]

$$R_0=C_{100}+C_{101}+(C_{110}+C_{111}),$$

$$R_1=C_{010}+C_{011}+(C_{110}+C_{111}), \quad (24a)$$

$$R_2=C_{001}+C_{011}+C_{101}C_{111}$$

$$[n]A=\psi^4(R_2)\psi^2(R_1)+R_0 \quad (24b)$$

The calculation of expression (17) using expression (22) requires 3 times of elliptic doublings and 16 times of elliptic additions, but, the calculation of expressions (23) and (24) requires only 3 times of elliptic doublings and 14 times of elliptic additions. In this way, the number of elliptic additions can be reduced in the embodiment of the present invention.

(Algorithm)

Next, the embodiment of the present invention is more mathematically explained. The number of rows r and the number of columns c are considered as in FIG. 7. In this case, the coefficient n in the scalar multiplication is considered as follows.

[E86]

$$n = \sum_{i=0}^{r-1} \sum_{j=0}^{c-1} n_{ij} \psi^{ci+j}. \quad (25)$$

And according to the embodiment of the present invention, [n]A is calculated as follows.

[E87]

$$S_{jl} = \left\{ x \mid \sum_{i=0}^{r-1} 2^i \{(n_{ij} \& 2^x)/2^x\} = l, 0 \le x < t \right\},$$

$$0 \le j < c, 1 \le l < 2^r$$

$$T_i = \{y \mid (2^i \& y) = 2^i, 1 \le y < 2^r - 1\}, 0 \le i < r$$

$$C_l = \sum_{j=0}^{c-1} \psi^j \left( \sum_{k \in S_{jl}} [2^k]A \right)$$

$$R_i = \sum_{j=0}^{c-1} \psi^j ([n_{ij}]A) = \sum_{k \in T_i} C_k, 0 \le i < r$$

$$[n]A = \sum_{i=0}^{r-1} \psi^{ci}(R_i)$$

[E87] described above are respectively (26a), (26b), (26c), (26d), (26e), beginning at the top.

In addition, and $|S_{jl}| \le t$ and $|T_i| \le 2^r - 1$. In the example in the article (Specific explanation of embodiment 1), when $\psi=\phi$, since m in expression (15) is 6 and c=2, r=Ceil(m/c)=3 then, the required numbers of temporary variables $C_l$ and $R_i$ are 7 ($=2^r-1$) and 3 ($=r$) as is noted from expression (26). For the preparation of $[2^i]A$, $1 \le i < t$ in expression (26c) 3 times ($=t-1$) of doublings and for preparation of $C_l$, $1 \le l < 2^r$, less than or equal to 8 times of elliptic additions are required. Here, $t=4=Flr(\log_2(\max(n_i)))$. Using these temporary data, [n]A is obtained by less than or equal to 23 times ($=r(2^r-1)+(r-1)$) of elliptic additions as shown in expression (26c), (26d), and (26e). In addition, there requires 9 times ($=(c-1)(2^r-1)+(r-1)$) of operations of map F.

Embodiment 2 of Scalar Multiplication

Figure 8:
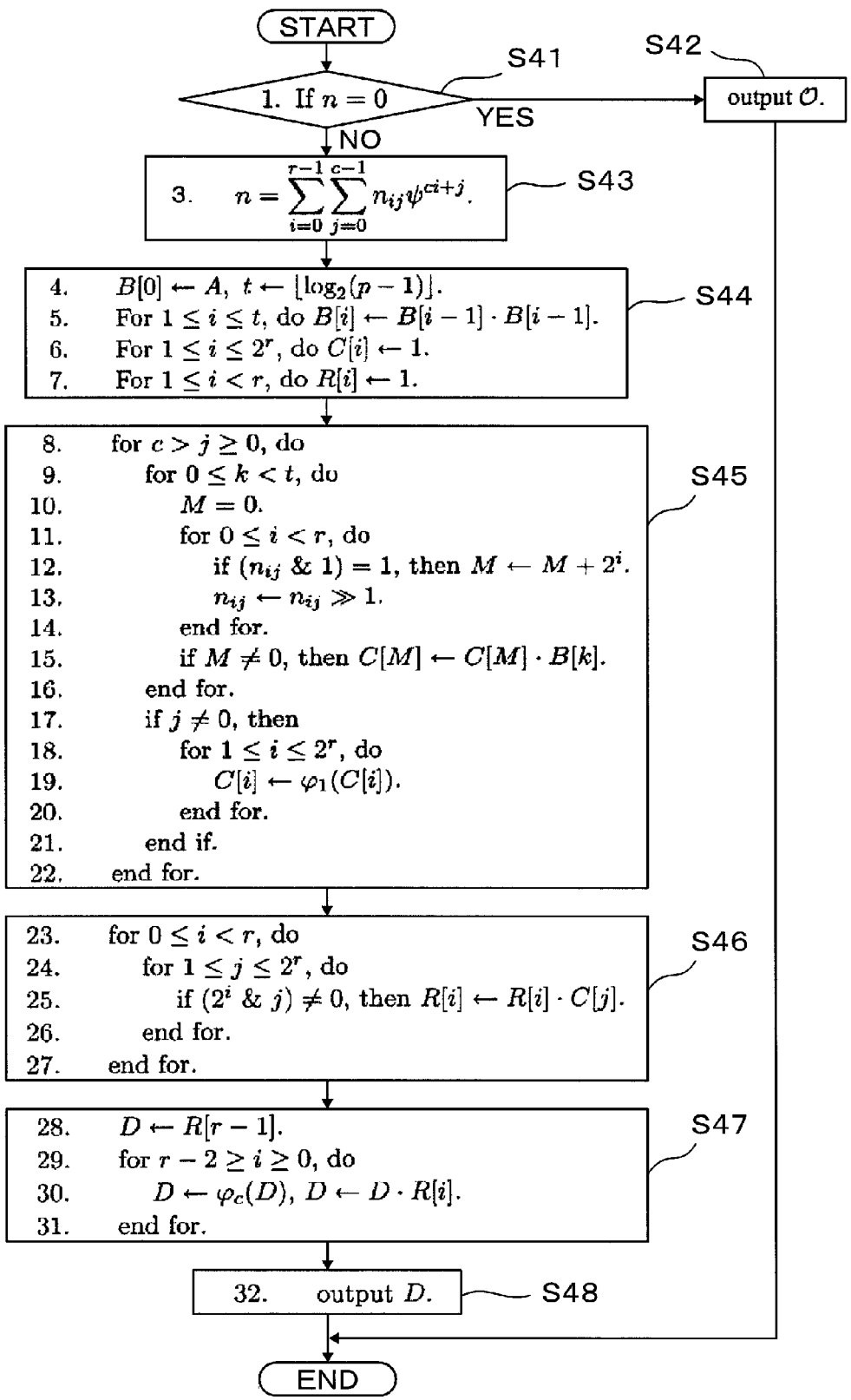
FIG. 8 is a flowchart of an arithmetic operation program for scalar multiplication.

FIG. 8 is a flowchart of an arithmetic operation program for scalar multiplication according to the embodiment of the present invention, arithmetic operations ranging from (25) to (26e) are performed. An electronic computer, when a coefficient n of the scalar multiplication is 0 (Y in step S41), outputs point at infinity O (step S42) and finishes. When the coefficient n of the scalar multiplication is not 0 (N in step S41), the operation of ψ-adic expansion of the coefficient n as represented in expression (25) is performed (step S43).

In the following, ψ-adic expansion of n represented in expression (25) is obtained. The electric computer sets B[0] to be rational point A, and sets t to be maximum number of columns in binary representation by maximum value of coefficients of $\psi^i$. Then, the electronic computer sets B[i] to be multiples of the rational point A, and sets initial values of C[i] and R[i] to be point at infinity (step S44).

The electronic computer obtains temporary data C at attached number 8 to attached number 22 in step S45. The electronic computer, at first, sets M=0 (attached number 10 in step S 45), and determines whether logical product $n_{ij}$&1 of coefficient $n_{ij}$ is 1, and when the logical product is 1, adds $2^i$ to M (attached number 12 in step S45). Next, the electronic computer performs bit shift of the coefficient $n_{ij}$ by 1 bit to the right through $n_{ij}$>>1 (attached number 13 in step S45). The electronic computer repeats the operations above from i=0 to r (attached number 11 to attached number 14 in step S45).

Next, the electronic computer determines whether M is 0, and when m is not 0, performs the operation to add B[k] to temporary data C[M] (attached number 15 in step S45). The electronic computer repeats the operations above from k=0 to t (attached number 9 to attached number 16 in step S45). Next, the electronic computer determines whether j is 0 (attached number 17 in step S45), and when j is not 0, repeats the operations to substitute ψ(C[k]) for temporary data C[k] from k=1 to $2^r$ (attached number 18 to attached number 20 in step S45). The electronic computer repeats the operations above from j=c−1 to 0 (attached number 8 to attached number 22 in step S45).

Next, the electronic computer determines whether logical product $2^i$&j is 0, and when the logical product is not 0, performs operations to add C[j] to R[i] (attached number 25 in step S46). The electronic computer repeats the operation from j=1 to $2^r$ (attached number 24 to attached number 26 in step S46). Next, the electronic computer repeats the operations above from i=0 to r (attached number 23 to attached number 27 in step S46).

Next, the electronic computer sets R[r−1] to be D (attached number 28 in step S47), substitutes D for $\psi^C(D)$, adds R [i] to D (attached number 30 in step S47), and repeats the operation from i=r−2 to 0 (attached number 29 to attached number 31 in step S47). Next, the electronic computer outputs D (attached number 32 in step S48) and finishes.

In this way, further speeding up of the arithmetic operations can be implemented by employing semiconductor device for scalar multiplication. Moreover, the semiconductor device for scalar multiplication, instead of making it one semiconductor device per se, may be incorporated into a part of other semiconductor devices such as semiconductor device for encryption and decryption.

In addition, as is clear from the explanation above, the arithmetic operation method for scalar multiplication explained in the <Embodiment 1 of scalar multiplication> is similar to the arithmetic operation method for exponentiation explained in the <Embodiment 1 of exponentiation>. That is, in scalar multiplication, temporary data is combined with operator of addition +. In exponentiation, temporary data is combined with operator of multiplication ·. The arithmetic operation of temporary data only differs in the operator, in both exponentiation and scalar multiplication, calculation methods thereof are similar.

Further, in the article <Embodiment 3 of exponentiation>, all of the n(Y) elements Y consisting of $Y_0, Y_1, \ldots Y_{n(Y)-1}$ and all of the appropriate number of n(X) elements X which are given respectively from the set $\{X_0, X_1, \ldots, X_{n(X)-1}\}$ are assumed to be combined with operator · and each element Y is represented by temporary data combined with the operator ·. In the temporary data which is included in each element Y, when there exists a combination of temporary data common in plurality of elements Y, the common temporary data is combined into a new temporary data. And the arithmetic operation method using the new temporary data has been explained.

The calculation method of the temporary data can be applied, as it is, to the scalar multiplication by replacing multiplication operator · with addition operator +. That is, $F^i$ terms of coefficients $[n_i]A$ can be set to be elements Y and $\psi^0([n_i]A), \psi^1([n_1]A), \ldots, \psi^s([n_s]A)$ which are expanded terms of endomorphism in scalar multiplication can be set to be elements X. Accordingly, the arithmetic operations method explained in respective articles <Embodiment 4 of exponentiation>, <Embodiment 5 of exponentiation>, and <Embodiment 6 of exponentiation> can be applied to arithmetic operations method for scalar multiplication by replacing multiplication operator · with addition operator +.

Furthermore, flowcharts in FIG. 2, FIG. 4, FIG. 5, FIG. 6 and FIG. 8 are executed by an electronic computer formed on semiconductor substrate 10 in FIG. 3. Arithmetic operation part 20 performs arithmetic processing based on a program by reading the program stored in memory part 30. The arithmetic operation part 20, in initializing, for example, reads out data inputted from input/output part 40, or data stored in predetermined area in memory part 30, performs arithmetic operations and stores results in predetermined area in memory part 30 corresponding to variables. The arithmetic operation part 20 performs based on programs, multiplication processing, addition processing, arithmetic operations represented by "for", "if" and the like, and stores the results in the predetermined area in memory part 30 corresponding to the variables or stores the results as output data. The arithmetic operation part 20 reads out operation results stored in the predetermined area in memory part 30 and transmits the results to input/output part 40, thus outputting the processing results.

INDUSTRIAL APPLICABILITY

The arithmetic operation method and the arithmetic operation device can perform arithmetic operations such as expo-nentiation or scalar multiplication at high speed and hence, are applicable to the use of encryption and decryption of plain text data.

What is claimed is:
1. An arithmetic operation method for exponentiation wherein an exponentiation $A^n$ of an element A in an extension field of $F_p^m$ of characteristic p and extension degree m, using an exponent n in p-adic representation

$$n = \sum_{i=0}^{s} n_i p^i, 0 \le n_i \le p, s = \lfloor \log_p n \rfloor \quad [E1]$$

is represented by the Frobenius map as $$A^n = \prod_{i=0}^{s} \varphi_i(A^{n_i}), \quad [E2]$$

the arithmetic operation method for exponentiation comprising the steps of:
configuring an electronic computer to perform the functions of:
putting together, with respect to the exponent n, a term of p having predetermined degree and a term of p having degree higher than the degree by one degree or a plurality of terms of p having degree higher than the degree by more than one degree into a tuple, dividing the exponent n into a plurality of tuples, specifying coefficient of the minimum degree by factoring out each term in each tuple with minimum degree, and setting for each column temporary data having an index which indicates whether a value is present at the same column in each tuple in the case where exponentiation of the element A with an exponent of the coefficient is performed with this coefficient being represented in p-adic notation;
specifying a value of the temporary data using a multiplier in a column at which a value is present in the temporary data; and
setting a result of multiplication between the predetermined temporary data as a result of exponentiation with an exponent of the coefficient in each tuple.
2. An arithmetic operation method for exponentiation according to claim 1, in the case where the result of exponentiation with an exponent of the coefficient in each tuple is performed, comprising the steps of:
specifying a combination of temporary data to be multiplied in common; and
performing the result of exponentiation with an exponent of the coefficient in each tuple using the combination of the temporary data.
3. A method for encryption and decryption of plain text data, comprising implementing the arithmetic operation method of claim 2 by means of a computer.
4. A method for encryption and decryption of plain text data, comprising implementing the arithmetic operation method of claim 1 by means of a computer.
5. An arithmetic operation method for scalar multiplication wherein, denoting a m-th extension field of a finite field $F_p$ of characteristic p as $F_p^m$, the total number of rational points as #$E(F_p^m)$, and point at infinity as O, an elliptic curve over a finite field $F_p$ is represented as the following expression, $$E(x,y) = x^3 + ax + b - y^2 = 0, a, b \in \mathbb{F}_p \quad [E3]$$

an arbitrary rational point A satisfies the following expression, $$[\#E(\mathbb{F}_{p^m})]A = \mathcal{O} \quad [E4]$$

and a scalar part [n] is performed σ-adic expansion represented as $$[n]A = \sum_{i=0}^{s} \{\psi^i([n_i]A)\}, \quad [E5]$$

the arithmetic operation method for scalar multiplication characterized by comprising the steps of:
configuring an electronic computer to perform the functions of: putting together, with respect to i,
a term of map φ with predetermined degree and a term of map φ having a degree higher than the predetermined degree by one degree or plural terms of map φ having a degree higher than the predetermined degree by more than one degree into a tuple,
dividing map F into a plurality of tuples, and specifying a coefficient of minimum degree by factoring each term in each tuple;
setting for each column temporary data having an index which indicates whether or not a value is present at the same column in φ-adic representation in each tuple in the case where an addition of the element A is performed with the coefficient being in φ-adic representation; and
specifying each $[n_i]A$ in φ-adic representation which constitutes said each coefficient by results of additions between the temporary data.

6. A method for encryption and decryption of plain text data, comprising implementing the arithmetic operation method of claim 5 by means of a computer.

7. An arithmetic operation method wherein, in the case where there exists a plurality of different elements Y and each of the elements Y is represented by tuples in which a plurality of different elements X are combined with an operator, said each element Y is calculated by an electronic computer, the arithmetic operation method comprising the steps of:
configuring the electronic computer to perform the functions of:
associating each element X with said each element Y by setting said each element X, wherein each element Y is represented by tuples in which a plurality of different elements X are combined with an operator, the operator being multiplication for exponentiation and addition for scalar multiplication;
setting temporary data, including indices, a number of indices being based on a number of tuples, and each of the indices indicates whether or not a value is present in each tuple corresponding to each of the plurality of different elements Y, wherein said each element Y has an identical element X for each said element X and representing said each element Y by the temporary data combined with the operator; in the case where there is a combination of temporary data which is common in plurality of elements Y in temporary data contained in said each element Y,
setting new temporary data by combining the common temporary data; and
calculating each element Y consisting of said each tuple using the new temporary data.

8. An arithmetic operation method according to claim 7, wherein in the step of setting new temporary data by combining the common temporary data, dividing the plurality of elements Y into a plurality of groups and setting new temporary data by combining temporary data which is common in the divided group.

9. A method for encryption and decryption of plain text data, comprising implementing the arithmetic operation method of claim 7 by means of a computer.

10. An arithmetic operation method according to either one of claim 7 or claim 8, wherein an exponentiation $A^n$ of an element A in an extension field $F_p^m$ of characteristic p and extension degree m, using an exponent n in p-adic representation $$n = \sum_{i=0}^{s} n_i p^i, \; 0 \leq n_i \leq p, \; s = \lfloor \log_p n \rfloor \quad [E6]$$

is represented by the Frobenius map as $$A^n = \prod_{i=0}^{s} \varphi_i(A^{n_i}) \quad [E7]$$

and the operator is multiplication, the plurality of elements Y are given in the form of exponentiation $A^{n_i}$, wherein $A^{n_i}$ denotes exponentiation of A with exponent $n_i$, defined by each coefficient $n_i$ in p-adic representation of the element A and the plurality of elements X are selected out of A, $A^2, \ldots, A^{2^u}$, wherein $A^{2^u}$ denotes exponentiation of A with exponent $2^u$, which are exponentiation of the element A, $u=\text{Flr}(\log_2(\max(n_i)))$ and the Frobenius map thereof.

11. An arithmetic operation method according to either one of claim 7 or claim 8, wherein, in a scalar multiplication, denoting a m-th extension field of a finite field $F_p$ of characteristic p as $F_p^m$, the total number of rational points as $\#E(F_p^m)$, and point at infinity as O, an elliptic curve over a finite field $F_p$ is represented as the following expression, $$E(x,y) = x^3 + ax + b - y^2 = 0, a, b \in \mathbb{F}_p \quad [E8]$$

an arbitrary rational point A satisfies the following expression, $$[\#E(\mathbb{F}_{p^m})]A = \mathcal{O} \quad [E9]$$

and a map φ consisting of coefficient parts [n]A is performed φ-adic expansion represented as $$[n]A = \sum_{i=0}^{s} \{\psi^i([n_i]A)\} \quad [E10]$$

characterized in that the operator is addition, the plurality of elements Y are given in the form of scalar multiplication $[n_i]A$ defined by coefficient $[n_i]$ of the $\phi^i$ term and φ map thereof and the plurality of elements X are selected out of A, [2]A, ..., $[2^u]$A which are scalar multiplication of the element A, $u=\text{Flr}(\log_2(\max(n_i)))$ and the φ map thereof.

12. An arithmetic operation device for exponentiation wherein an exponentiation $A^n$ of an element A in an extension field $F_p^m$ of characteristic p and extension degree m, using exponent n in p-adic representation $$n = \sum_{i=0}^{s} n_i p^i, \quad 0 \le n_i \le p, \quad s = \lfloor \log_p n \rfloor \qquad [\text{E11}]$$

is represented by the Frobenius map as $$A^n = \prod_{i=0}^{s} \varphi_i(A^{n_i}) \qquad [\text{E12}]$$

and there is put together, with respect to the exponent n, a term of p having predetermined degree and a term of p having degree higher than the degree by one degree or a plurality of terms of p having degree higher than the degree by more than one degree into a tuple, dividing the exponent n into a plurality of tuples, factoring out each term in each tuple with minimum degree, specifying coefficient of the minimum degree, the device comprising:
 a memory part which is configured to store a value of temporary data which, in the case where exponentiation of the element A with an exponent of the coefficient is performed, by setting for each column temporary data having an index which indicates whether a value is present at the same column in each tuple, is specified using a multiplier in a column at which a value is present in the temporary data; and
 a memory part which is configured to store a result of multiplication between the said predetermined temporary data as a result of exponentiation with an exponent of the coefficient in each tuple.

13. An arithmetic operation device for exponentiation according to claim 12, comprising:
 a memory part which is configured to, in the case where the result of exponentiation with an exponent of the coefficient in each tuple is performed, specify a combination of temporary data to be multiplied in common, perform and store the result of exponentiation with an exponent of the coefficient in each tuple using the combination of the temporary data.

14. A device for encryption and decryption of plain text data, comprising an arithmetic operation device according to claim 13.

15. A device for encryption and decryption of plain text data, comprising an arithmetic operation device according to claim 12.

16. An arithmetic operation device for scalar multiplication wherein, denoting a m-th extension field of a finite field $F_p$ of characteristic p as $F_p^m$, the total number of rational points as $\#E(F_p^m)$, and point at infinity as O, an elliptic curve over a finite field $F_p$ is represented as the following expression, $$E(x,y) = x^3 + ax + b - y^2 = 0, a, b \in F_p \qquad [\text{E13}]$$

an arbitrary rational point A satisfies the following expression, $$[\#E(F_p^m)]A = \mathcal{O} \qquad [\text{E14}]$$

and a scalar part [n] is performed φ-adic expansion represented as $$[n]A = \sum_{i=0}^{s} \{\psi^i([n_i]A)\}, \qquad [\text{E15}]$$

the arithmetic operation device having an arithmetic operation circuit for scalar multiplication being configured for:
 putting together, with respect to i, a term of map φ with predetermined degree and a term of map φ having a degree higher than the predetermined degree by one degree or plural terms of map φ having a degree higher than the predetermined degree by more than one degree into a tuple;
 dividing map F into a plurality of tuples;
 specifying a coefficient of minimum degree by factoring out each term in each tuple;
 setting for each column temporary data having an index which indicates whether or not a value is present at the same column in φ-adic representation in each tuple in the case where an addition of the element A is performed with the coefficient being in φ-adic representation; and
 specifying each $[n_i]A$ in φ-adic representation which constitutes said each coefficient by results of additions between the temporary data.

17. A device for encryption and decryption of plain text data, comprising an arithmetic operation device according to claim 16.

\* \* \* \* \*